(12) United States Patent
Randall et al.

(10) Patent No.: US 8,120,922 B2
(45) Date of Patent: Feb. 21, 2012

(54) APPARATUS FOR STORING DATA

(75) Inventors: Andrew Paul George Randall, Newbury (GB); Alan Jeffery, Ripley (GB); David Ian Belcher, Wantage (GB); Alastair Bryers, Wallingford (GB); Stephen Freeman, Leamington Spa (GB)

(73) Assignee: Nexsan Technologies Limited, Derby (GB)

( * ) Notice: Subject to any disclaimer, the term of this patent is extended or adjusted under 35 U.S.C. 154(b) by 51 days.

(21) Appl. No.: 12/646,532

(22) Filed: Dec. 23, 2009

(65) Prior Publication Data

US 2010/0172083 A1 Jul. 8, 2010

(30) Foreign Application Priority Data

Dec. 23, 2008 (GB) .................................. 0823407.2
Aug. 17, 2009 (GB) .................................. 0914332.2

(51) Int. Cl.
*H05K 5/00* (2006.01)
*H05K 7/00* (2006.01)
(52) U.S. Cl. ....................................... 361/725; 361/727
(58) Field of Classification Search .......... 361/724–727; 340/815.4, 815.45, 815.47
See application file for complete search history.

(56) References Cited

U.S. PATENT DOCUMENTS

| | | | |
|---|---|---|---|
| 3,448,346 A | 6/1969 | Webb | |
| 3,647,936 A | 3/1972 | Dryg | |
| 3,710,199 A * | 1/1973 | Cignoni, Jr. .................. | 361/827 |
| 3,744,869 A | 7/1973 | Anderson et al. | |
| 3,903,404 A * | 9/1975 | Beall et al. ................. | 361/679.4 |
| 4,660,125 A * | 4/1987 | Purdy et al. .................. | 361/727 |
| 4,686,608 A * | 8/1987 | Hosking ....................... | 361/827 |
| 5,193,050 A * | 3/1993 | Dimmick et al. ............. | 361/694 |
| 5,237,484 A * | 8/1993 | Ferchau et al. .............. | 361/689 |
| 5,381,315 A * | 1/1995 | Hamaguchi et al. .......... | 361/727 |
| 5,450,285 A | 9/1995 | Schlemmer | |
| 5,761,032 A | 6/1998 | Jones | |
| 6,025,989 A | 2/2000 | Ayd et al. | |
| 6,065,080 A * | 5/2000 | Alpert .......................... | 710/301 |
| 6,067,711 A * | 5/2000 | Ruque ............................ | 29/857 |
| 6,070,742 A | 6/2000 | McAnally et al. | |
| 6,327,139 B1 | 12/2001 | Champion | |
| 6,392,884 B1 | 5/2002 | Chou | |
| 6,459,571 B1 | 10/2002 | Carteau | |
| 6,462,670 B1 | 10/2002 | Bolognia et al. | |

(Continued)

FOREIGN PATENT DOCUMENTS

AT 352933 B 10/1979

(Continued)

*Primary Examiner* — Jinhee Lee
*Assistant Examiner* — Adrian S Wilson
(74) *Attorney, Agent, or Firm* — Arthur Jacob

(57) ABSTRACT

An apparatus for storing data and supplying stored data. The apparatus comprises a support unit having a plurality of connectors for connecting to a plurality of data storage elements, and a plurality of data storage elements. Each data storage element is connected to one of the connectors. The apparatus also comprises a cable having a first end connected to the support unit and a second end connected to a main part. The main part defining a first space containing a portion of the cable, and a second space for containing the support unit. The support unit is movable between (i) a first position providing access to the data storage elements and (ii) a second position in which the data storage elements are located within the second space. A guide means is configured to cause the cable to develop at least two loops within the first space while the support unit is moved to the second position.

19 Claims, 18 Drawing Sheets

U.S. PATENT DOCUMENTS

| | | |
|---|---|---|
| 6,590,768 B1 | 7/2003 | Wiley |
| 6,621,693 B1 | 9/2003 | Potter et al. |
| 6,736,661 B2 * | 5/2004 | Homer .......................... 439/344 |
| 7,200,008 B1 * | 4/2007 | Bhugra ......................... 361/724 |
| 7,359,186 B2 * | 4/2008 | Honda et al. ............. 361/679.33 |
| 7,583,507 B2 * | 9/2009 | Starr et al. .................... 361/727 |
| 2003/0045159 A1 | 3/2003 | Boudreaux |
| 2003/0049105 A1 | 3/2003 | Mueller et al. |
| 2006/0002093 A1 | 1/2006 | Carlson et al. |
| 2006/0028805 A1 | 2/2006 | Hidaka |
| 2006/0048001 A1 | 3/2006 | Honda et al. |
| 2006/0112138 A1 * | 5/2006 | Fenske et al. .............. 707/104.1 |
| 2006/0164928 A1 * | 7/2006 | Starr et al. ................. 369/30.01 |
| 2006/0187634 A1 | 8/2006 | Tanaka et al. |
| 2007/0017883 A1 | 1/2007 | Bridges et al. |
| 2007/0053169 A1 * | 3/2007 | Carlson et al. ................ 361/727 |
| 2007/0230110 A1 | 10/2007 | Starr et al. |
| 2007/0230111 A1 | 10/2007 | Starr et al. |
| 2007/0233781 A1 | 10/2007 | Starr et al. |
| 2007/0247804 A1 | 10/2007 | Li et al. |
| 2008/0007912 A1 | 1/2008 | Matsushima et al. |
| 2008/0198892 A1 * | 8/2008 | Chiang ........................... 372/81 |

FOREIGN PATENT DOCUMENTS

| | | |
|---|---|---|
| DE | 2833043 A1 | 2/1979 |
| EP | 0109557 A1 | 5/1984 |
| EP | 0425447 A1 | 5/1991 |
| EP | 0635836 A1 | 1/1995 |
| EP | 1975940 A2 | 10/2008 |
| FR | 2491284 A1 | 4/1982 |
| GB | 1407022 A | 9/1975 |
| GB | 2377084 A | 12/2002 |
| JP | 57154229 A | 9/1982 |
| WO | 0196991 A1 | 12/2001 |
| WO | 2009114002 A1 | 9/2009 |

* cited by examiner

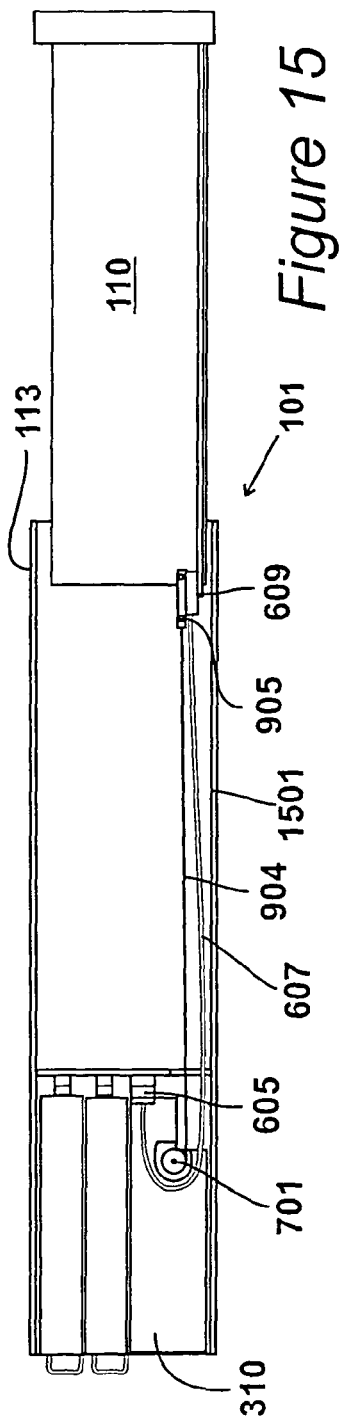
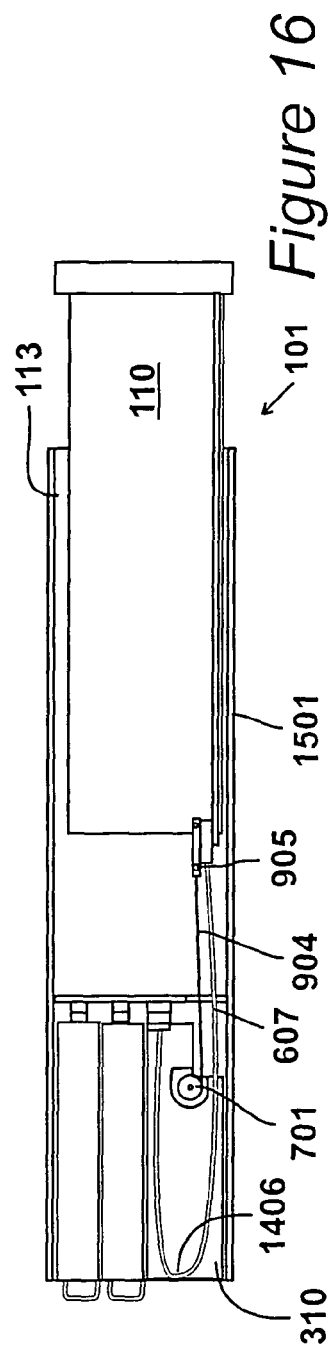
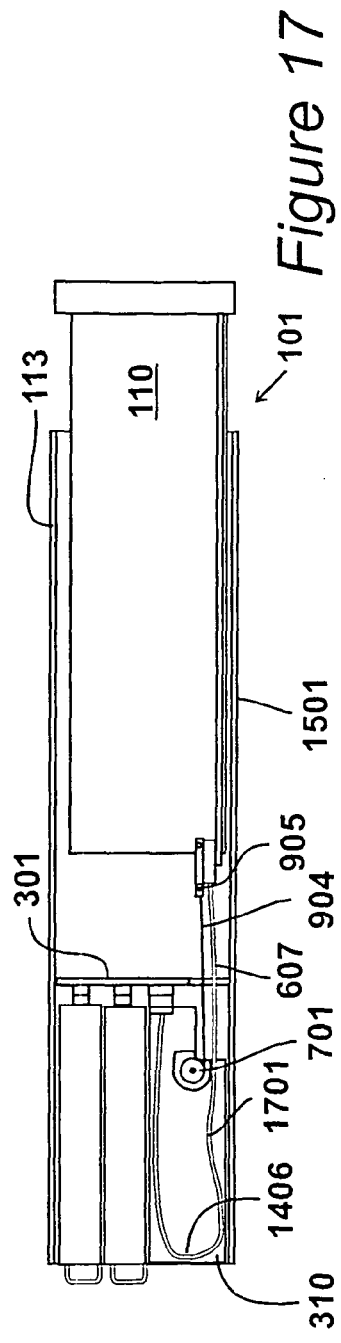
Figure 15
Figure 16
Figure 17

APPARATUS FOR STORING DATA

CROSS REFERENCE TO RELATED APPLICATIONS

This application claims priority from United Kingdom Patent Application No. 08 23 407.2, filed 23 Dec. 2008, and United Kingdom Patent Application No. 09 14 332.2, filed 17 Aug. 2009, the whole contents of which are incorporated herein by reference in their entirety.

BACKGROUND OF THE INVENTION

1. Field of the Invention

The present invention relates to apparatus for storing data and supplying stored data, and a method of manufacturing apparatus for storing data and supplying stored data.

2. Description of the Related Art

Data storage units are known that are configured for mass data storage or as RAID (redundant array of inexpensive disks) systems. Such storage units comprise of several disk drives and a control unit for controlling data input to, and output from, the disk drives. The storage units may be located within a standard size rack unit, typically occupying 1 U to 6 U (1 to 6 rack units) of rack space, and may share the rack with other equipment, and possibly other such data storage units.

Occasionally it is necessary to access the disk drives, for example, for the purposes of replacement of a defective drive, or a drive needing to be upgraded. In some data storage units access to the disk drives is made possible by the removal of a panel which forms part of the outer enclosure of the storage unit.

In recent times it has become known to have a data storage unit in which the disk drives are arranged in several groups, each group supported on a separate support structure that provides electrical connections between the disks drives and a cable connected to the control unit. Each support structure may be slid forward from out of the outer enclosure of the storage unit, while the support structure remains electrically connected by the cable to the control unit. Subsequently, when the support structures are slid back into their normal operating condition, the cable connecting the support structures and the control units must be retracted and stored within the data storage unit. Consequently, a limit on the length of the supporting structures currently exists when the storage units are to be located within a standard sized rack. Storage units are known that have a greater depth to receive supporting structures that are longer, but the problem then is that the storage unit will no longer fit into a standard sized rack cabinet.

BRIEF SUMMARY OF THE INVENTION

According to a first aspect of the present invention, there is provided apparatus for supporting data storage elements and supplying stored data, said apparatus comprising: a support unit having a plurality of connectors for connecting to a plurality of data storage elements; a cable having a first end connected to said support unit and a second end connected to a main part; a main part defining a first space containing a portion of said cable, and a second space for containing said support unit, such that said support unit is movable between (i) a first position providing access to said data storage elements and (ii) a second position in which said data storage elements are located within said second space; and guide means causing said cable to develop at least two loops within said first space while said support unit is moved to said second position.

According to a second aspect of the present invention, there is provided a method of manufacturing apparatus for storing data and supplying stored data, said method comprising: producing a support unit having a plurality of connectors for connecting to a plurality of data storage elements; connecting a plurality of data storage elements, to said connectors of said support unit; producing a main part by locating a control unit within an outer enclosure, said main part defining a first space and a second space; connecting a cable between said support unit and said main part; extending a guide member such that said guide member extends from said support unit through said second space alongside said cable; and sliding said support unit from a first position in which access is provided to said data storage elements to a second position in which said data storage elements are located within said second space and said cable is folded into at least two loops within said first space.

BRIEF DESCRIPTION OF THE SEVERAL VIEWS OF THE DRAWINGS

FIG. 15 shows a simplified cross-sectional view of the support unit 110 withdrawn from the outer enclosure 113 of data storage unit 101;

FIG. 16 shows the data storage unit 101 with the support unit 110 partially pushed back into the outer enclosure 113;

FIG. 17 shows the data storage unit 101 with the support unit 110 pushed further into the outer enclosure 113 when compared to FIG. 16.

DETAILED DESCRIPTION OF THE PREFERRED EMBODIMENTS

FIG. 1

Figure 1:
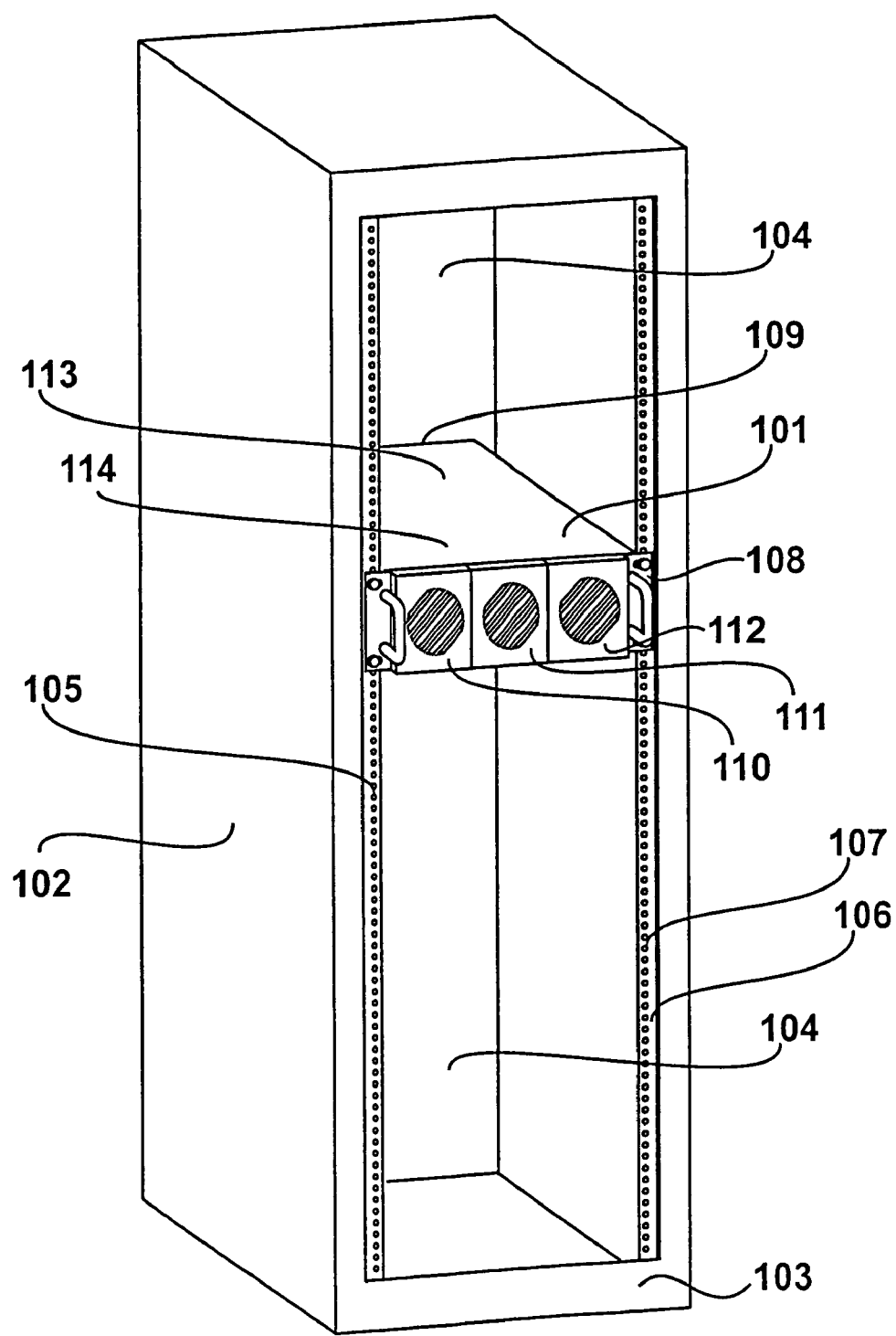
FIG. 1 shows a data storage unit 101 mounted in a rack 102.

A data storage unit 101 embodying the present invention is shown mounted in a rack 102 in FIG. 1.

The rack 102 is built in accordance with an international standard, EIA-310, and therefore has a specified depth from the front panel 103 to the back panel 104. Similarly, the rack 102 has a standard sized gap between a first rail 105 and a second rail 106 which form part of the front panel 103 and are provided with holes 107 allowing equipment such as storage unit 101 to be attached and supported.

The data storage unit 101 has a generally rectangular form, but includes a mounting plate 108 at its front end that is provided with apertures allowing the data storage unit to be attached to the rails 105 and 106 of the rack 102. Most of the data storage unit 101 has a width configured to allow said unit to pass between the rails 105 and 106 of the rack 102, and a depth that ensures a gap is provided between the rear end 109 of the data storage unit 101 and the back panel 104 of the rack 102 when the storage unit 101 is mounted, as shown in FIG. 1.

The data storage unit 101 comprises several data storage elements. In the present case, the data storage unit 101 comprises sixty data storage elements in the form of sixty 3.5" (three point five inch) disk drives arranged in three groups of twenty. Each group of twenty disk drives is mounted on one of three support units 110, 111 and 112 located within a space provided within the main part 114 of the data storage unit 101. Each disk drive is connected via its support unit to a control unit via a flexible cable connecting its support unit and a control unit mounted within the data storage unit 101.

The data storage unit is connected to one or more computers, which access and/or edit data stored on the disk drives. Communication between the data storage unit and the one or more computers may be made by known interfaces and protocols, for example communication may be made over a network such as a LAN, WAN, the Internet, etc. Similarly, communication may be made over a wire, optical link, radio link, etc.

The data storage unit 101 has an outer enclosure 113 in which the three support units 110, 111 and 112 are independently supported, such that they can each slide forward out of the outer enclosure 113 independently of the other two support units.

FIG. 2

Figure 2:
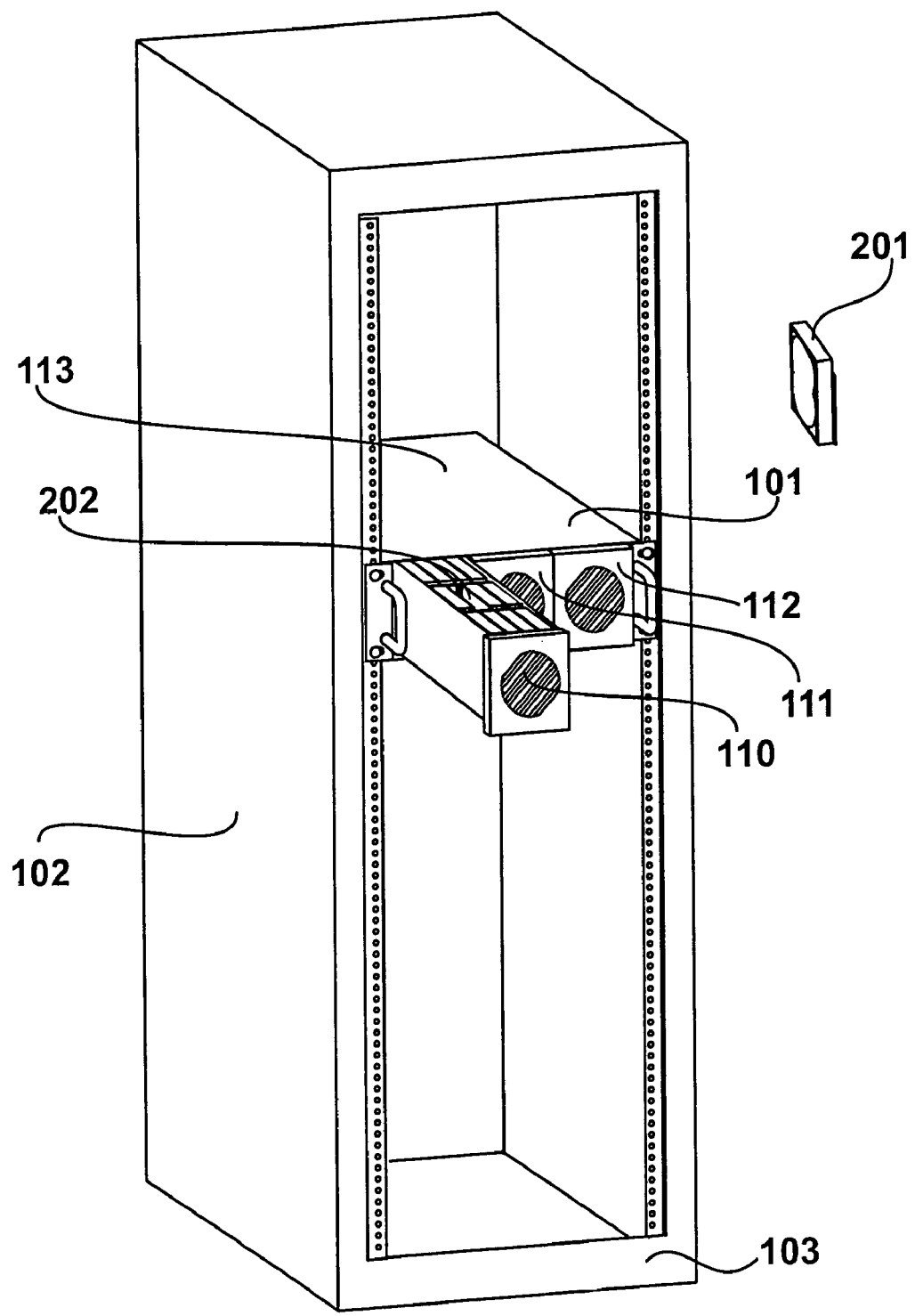
FIG. 2 shows the data storage unit 101 with a support unit 110 partially slid forward.

The rack 102 and data storage unit 101 are shown in FIG. 2 with the support unit 110 partially slid forward out of the enclosure 113.

Each of the support units 110, 111 and 112 contains twenty disk drives arranged in five rows of four. The support unit 110 has been pulled forward sufficiently to expose the first three rows of four disk drives and a drive to be replaced has been removed from the second row of disks leaving an empty disk drive bay 202. Thus, a new disk drive 201 may be located within the empty socket 202 of the support unit 110.

It may be noted that when it is fully withdrawn the support unit 110 allows all twenty disk drives to be supported in front of the front panel 103 of the rack. However, because the other two support units 111 and 112 may be left within the outer enclosure 113 of the data storage unit 101, the weight of the withdrawn support unit 110 cannot produce a sufficiently large moment of force to cause the rack 102 to tip forward.

As will be described below, the data storage unit 101 is provided with a mechanism that allows the support units to be slid forwards as shown in FIG. 2 and returned to their normal operating position, as shown in FIG. 1, without any danger of snagging cables.

FIGS. 3 & 4

Figure 3:
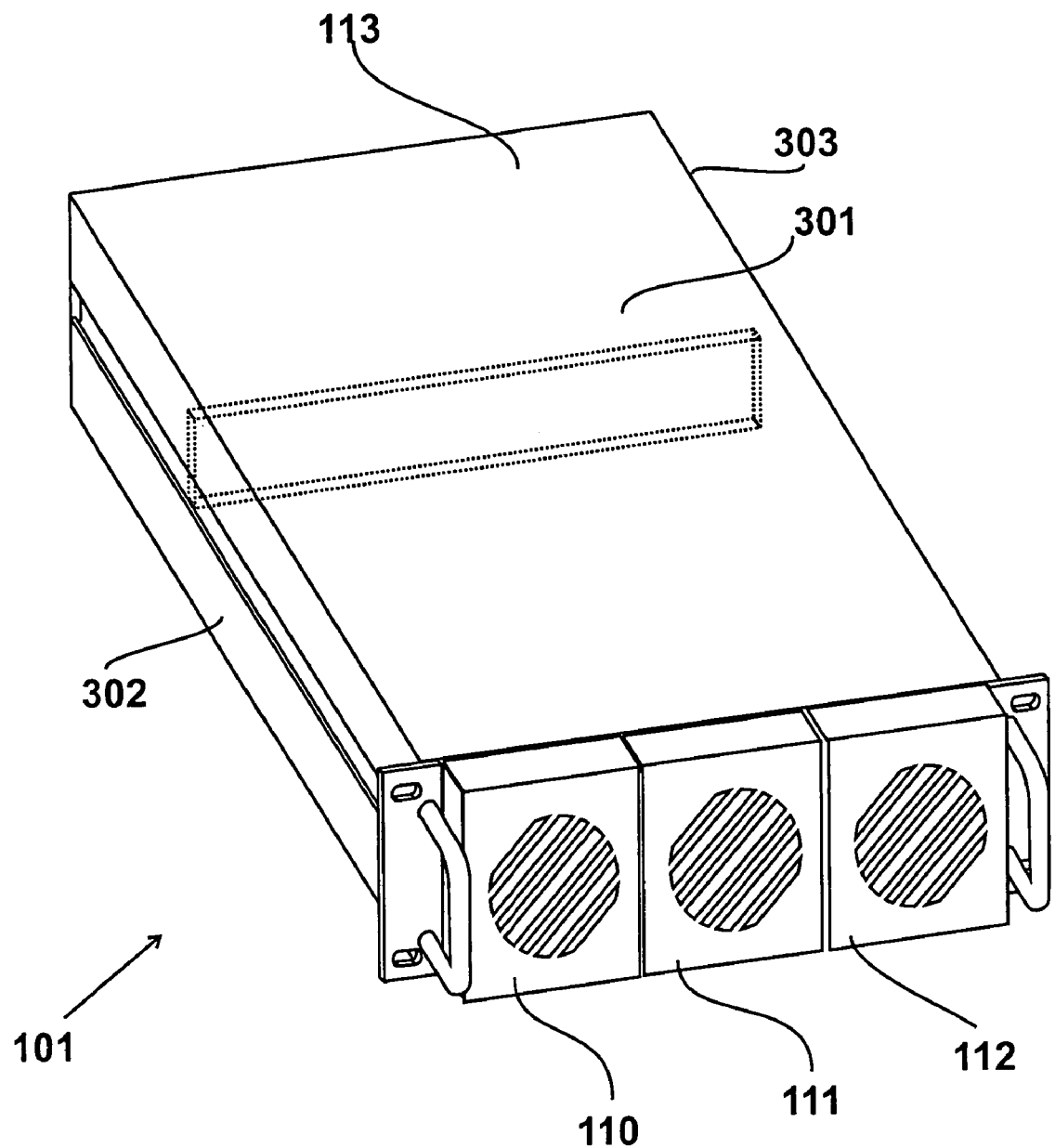
FIG. 3 shows a front perspective view the data storage unit 101.
Figure 4:
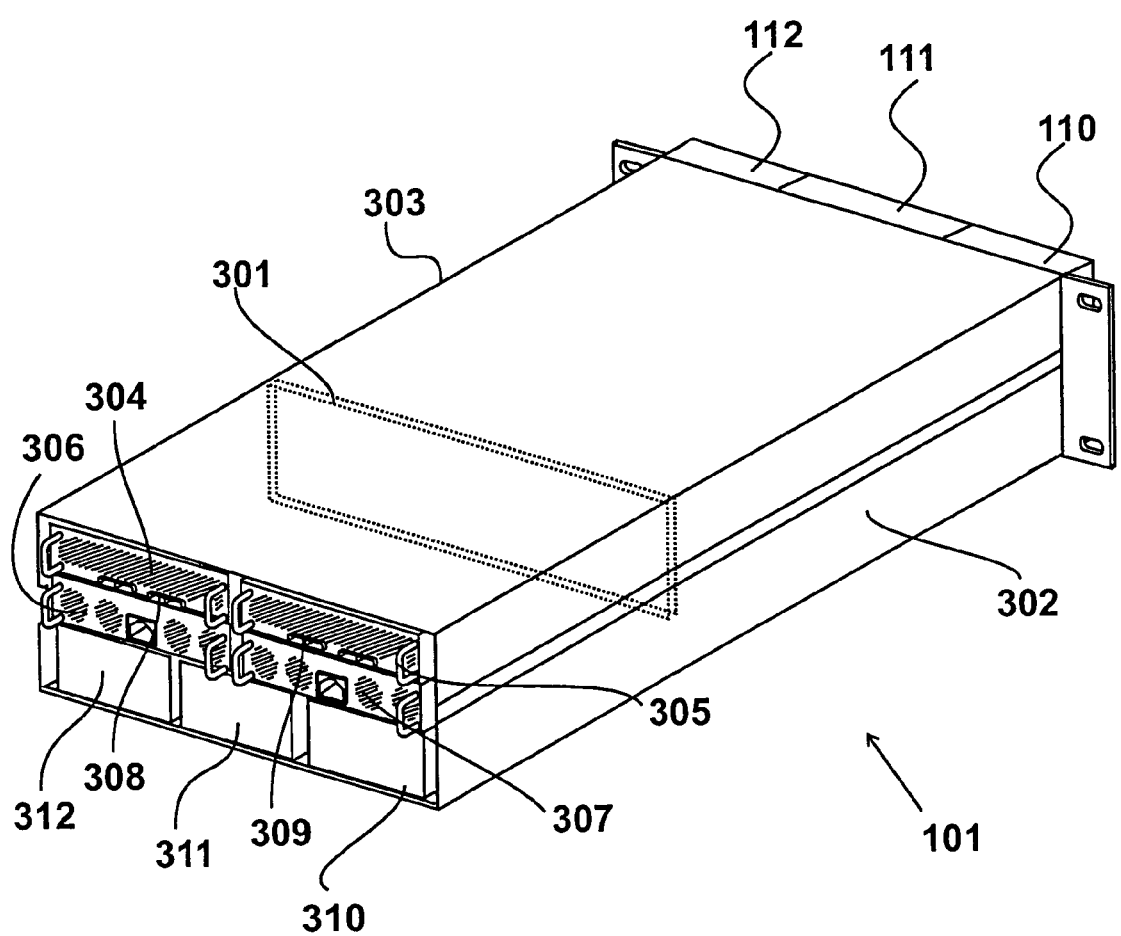
FIG. 4 shows a rear perspective view the data storage unit 101.

The data storage unit 101 is shown in each of FIGS. 3 and 4. FIG. 3 provides a view of the front, top and left side of the unit 101, while FIG. 4 provides a view of the rear, top and left side of the unit 101. The outer enclosure 113 is formed from several aluminium alloy extrusions and has a substantially rectangular box form with closed walls at the left, right, top and bottom sides and two open ends at the front and rear. The open-ended front allows access into a space formed within the enclosure 113 for the three support units 110, 111 and 112. Similarly, the open rear end allows access into the enclosure for components located towards the rear of the data storage unit 101. The support units 110, 111 and 112 occupy approximately the front two thirds of the enclosure while other components occupy the rear one third.

A printed circuit board referred to as the mid-plane 301, is mounted within the enclosure 113 perpendicular to the side walls of the enclosure 113. The mid-plane 301 (whose position within the outer enclosure 113 is indicated by a dotted line) extends between the left and right side walls 302 and 303 of the outer enclosure 113 and provides electrical connections between the other various components of the data storage unit 101.

Towards the rear of the unit 101, behind the mid-plane 301, the enclosure 113 contains two control units 304 and 305 and power supplies 306 and 307. The power supplies 306 and 307 are dual redundant power supplies. It is therefore possible for the data storage unit 101 to operate with just one of the power supplies operational.

The control units 304 and 305 are provided with suitable sockets 308, 309 to provide connection to a network, etc as previously mentioned. The rear surfaces of the power supplies 306 and 307 are provided with electrical sockets to allow connection to an electricity supply. The power supply units 306 and 307 are each configured to transform an electricity supply and thereby provide a suitable DC electricity supply for the data storage unit 101.

The data storage unit 101 also comprises three cable management units 310, 311 and 312. The cable management units are each linearly aligned with an associated one of the support units 110, 111 and 112. Thus, support unit 110 has an associated cable management unit 310, support unit 111 has an associated cable management unit 311, and support unit 112 has an associated cable management unit 312. The three cable management units are all similarly configured and perform similar functions in respect of their respective support unit. Essentially, the cable management units define a space in which electrical cables connecting the support units 110, 111, 112 and the control units 304, 305 (via the mid-plane 301) reside. The cable management units 310, 311, 312 will be further described below.

FIG. 5

Figure 5:
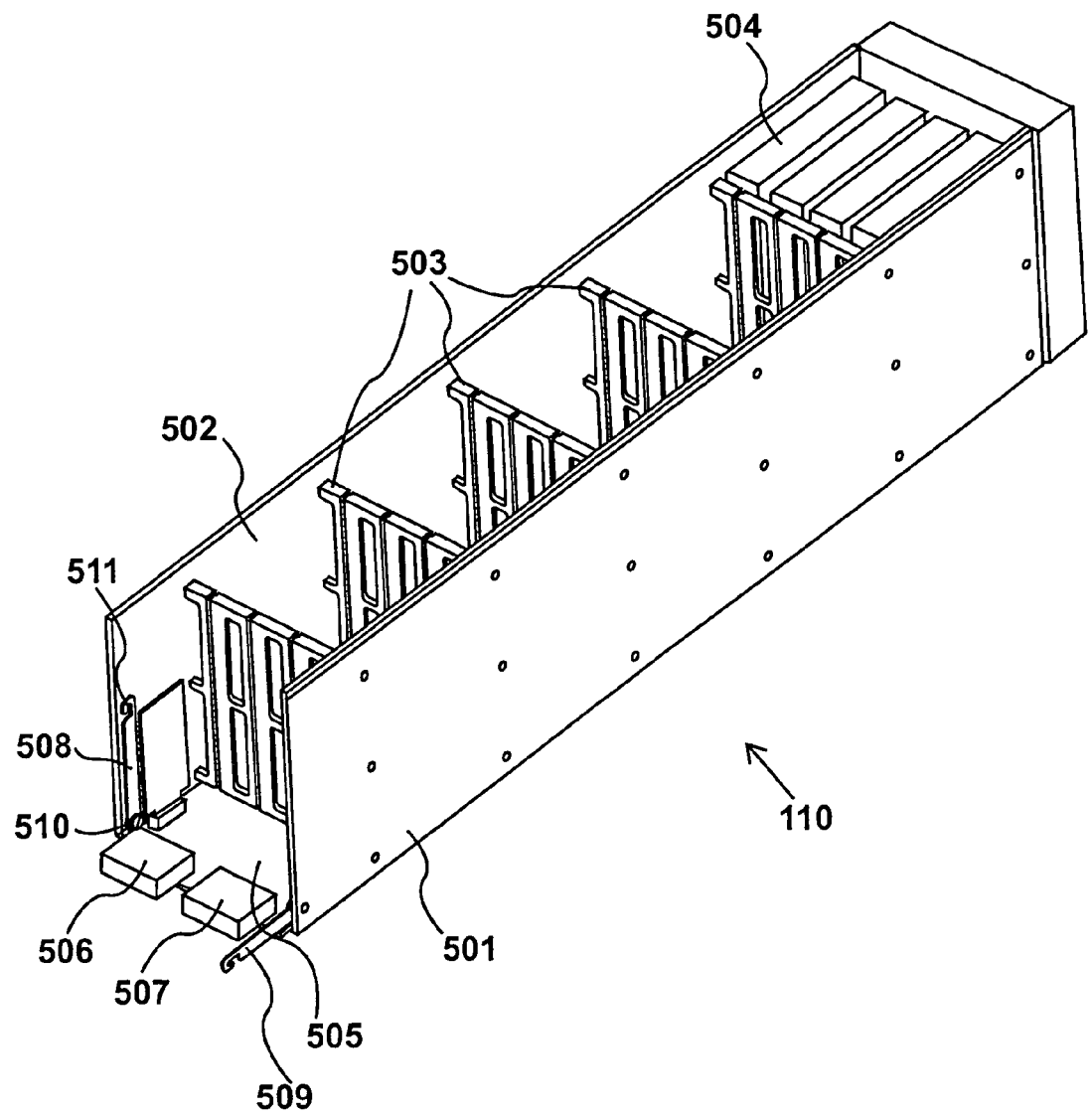
FIG. 5 shows the support unit 110 removed from the data storage unit.

The support unit 110 is shown removed from the data storage unit 101 in FIG. 5. The support unit 110 has a box-like structure having a pair of vertical side walls 501 and 502 extending upward from a metal floor (not shown). Six support elements 503 are rigidly attached to the side walls 501 and 502 of the support unit 110 such that they extend between the two side walls 501 and 502 to form five rows of disk drive bays 202. Each row of disk drive bays is configured to contain up to four disk drives. The support unit 110 in FIG. 5 only contains four disk drives 504 in the first row of disk drive bays nearest the front end of the support unit 110, the other four rows of bays being empty.

The support unit 110 further comprises a printed circuit board 505 extending substantially across the whole of the floor of the support unit 110. The printed circuit board 505 includes electrical connectors 506 and 507 providing power and high speed signal connections required for the operation and control of the disk drives 504 (some not shown as discussed earlier) by means of the suitable electronic circuitry in the disk drive bays 202. The printed circuit board 505 also includes suitable electronic circuits to allow the twenty disk drives to communicate with the control units 304 and 305. The configuration of the suitable electronic circuits and connections in printed circuit board 505 is such that control unit 304 communicates by means of connector 506 and suitable electronic circuits with the disk drive bays 202. Similarly control unit 305 communicates by means of connector 507 and suitable electronic circuits with the disk drive bays 202. The two sets of electronic paths to control units 304 and 305 are separate until combined in the suitable electronic circuitry of each disk drive bay 202. The electrical connector 506 has power and high speed signal connections that are connected through the printed circuit board 505 in a manner which allows control unit 304 to communicate with all twenty disk drive bays 202. Similarly the electrical connector 507 has power and high speed signal connections that are connected through the printed circuit board 505 in a manner which allows control unit 305 to communicate with all twenty disk drive bays 202. Printed circuit board 505 provides two substantially separate control and communication paths to the twenty disk drive bays 202. One path connects control unit 304 by means of electrical connector 506 to the twenty disk drive bays 202. The second path connects control unit 305 by means of electrical connector 507 to the twenty disk drive bays 202. The two electrical paths are arranged in such a way that the failure of one single component in the electrical connection path from control units 304 and 305 and the twenty disk drive bays 202 would render one disk drive bay 202 inaccessible through the control unit sockets 308 and 309.

The support unit 110 also comprises a pair of connecting arms 508 and 509. Connecting arm 508 has a first end connected to the vertical side wall 502 of the support unit 110 by a pivot connection 510. The pivot connection is formed of a short threaded bolt located within a threaded hole in the vertical side wall 502. The opposite end 511 of the connecting arm 508 is provided with a slot such that the end 511 has a hook shape.

The connecting arm 509 has the same form as connecting arm 508 but is pivotally connected to the other vertical side wall 501 of the support unit 110. Both of the support arms are pivotally mounted such that they can be rotated into a substantially vertical orientation, as connecting arm 508 is shown in FIG. 5, or can be rotated down to a substantially horizontal orientation, as connecting arm 509 is shown in FIG. 5. In normal use, both of the connecting arms 508 and 509 are rotated into their horizontal orientation and their hooked ends 511 are hooked around a connecting rod as will be described below.

Figure 6A:
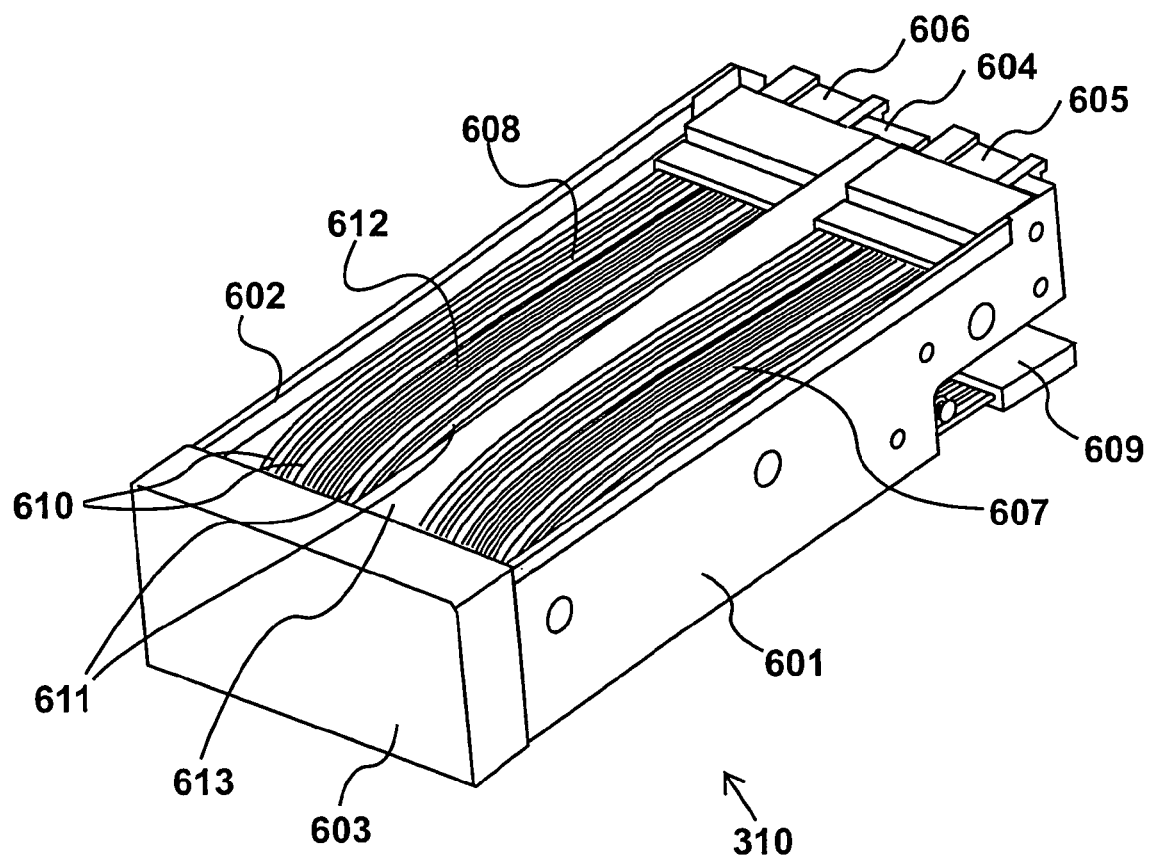
FIG. 6A shows the cable management unit 310 removed from the data storage unit.
Figure 6B:
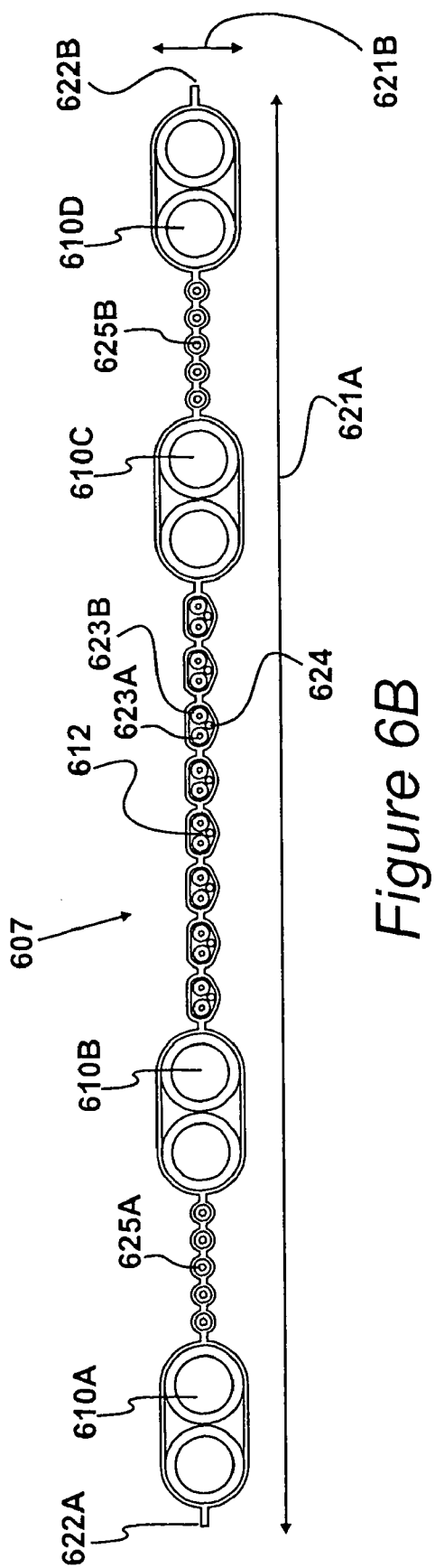
FIG. 6B shows a cross-section through the electrical cable 607.

FIGS. 6A and 6B

The cable management unit 310 is shown in FIG. 6A, removed from the data storage unit 101. The cable management units 310, 311 and 312 are substantially identical, and therefore it will be understood that the following description of cable management unit 310 similarly applies to the other two cable management units. The cable management unit 310 is formed on a metal u-shaped channel having side walls 601 and 602 extending upward from a floor (901, shown in FIG. 9). The rear end of the cable management unit 310 is closed by a rear wall 603, and the front end of the unit 310 is partially closed by a front wall 604 that supports two similar electrical connectors 605 and 606. The electrical connectors 605 and 606 extend forward from the front of the cable management unit 310 and are configured to mate with corresponding connectors on the mid-plane 301. The electrical connectors 605 and 606 are each electrically connected to a respective electrical cable 607 and 608. The electrical cables 607 and 608 are therefore connected at a first end to a respective one of the electrical connectors 605 and 606 and are terminated at their opposite end by an electrical connector 609 configured to mate with a corresponding one of the electrical connectors 506 and 507 on the support unit 110.

The cable management unit also comprises a partition wall 613, which extends centrally along the cable management unit 310 from the rear wall 603 to the front wall 604, between the two electrical cables 607 and 608. The partition wall 613 effectively splits the space within the cable management unit 310 in two, and ensures that the two electrical cables 607 and 608 do not mechanically interfere with each other.

The electrical cables 607 and 608 are each formed from similar electrical cable material, and a cross-sectional view of cable 607 is shown in FIG. 6B.

In order to provide the required mechanical properties for the present embodiment, the cable 607 is a ribbon cable having a width, indicated by arrow 621A, that is substantially greater than its thickness, indicated by arrow 621B. For the purposes of this specification a ribbon cable is defined as a cable having a width that is at least five times greater than its thickness.

Unlike conventional signal cables, each of the cables 607 and 608 comprises both power wires and high speed signal wires (SAS (serial attached SCSI (Small Computer System Interface) wires) in a single cable. The power wires are arranged in four pairs 610A, 610B, 610C and 610D of wires. Two pairs of power wires 610A and 610B extend close to one edge 622A of the cable 607 while the other pairs 610C and 610D of power wires extend close to the opposite edge 622B of the cable. The signal wires (SAS wires) 612 extend along a central portion of the cable between the two inner pairs of power wires 610B and 610C. The signal wires 612 in the present embodiment comprise of eight shielded parallel pairs, each said pair comprising a two thirty gauge (30 AWG) insulated wires 623A, 623B and having an associated tinned copper drain wire 624. In the present embodiment the eight shielded parallel pairs are arranged side by side, so that the sixteen signal wires lie in the same plane.

The cable 607 also comprises two similar groups of signal wires 625A and 625B. Each group comprises five single wires arranged side by side and positioned between two groups of power wires. Thus, the first group of wires 625A is arranged between the two power wire pairs 610A and 610B, while the second group of wires 625B is arranged between the two power wire pairs 610C and 610D.

In the present embodiment the power wires are each formed of fourteen gauge wire and consequently have a considerably larger gauge size than the signal wires. As a consequence, the cable material of cables 607 and 608 is substantially stiffer than conventional ribbon cables containing only signal wires.

In the present embodiment, the wires of the cable 607 are encased within an outer polyolefin sheath 626 that is formed around the wires in a lamination process.

FIG. 6C

Figure 6C:
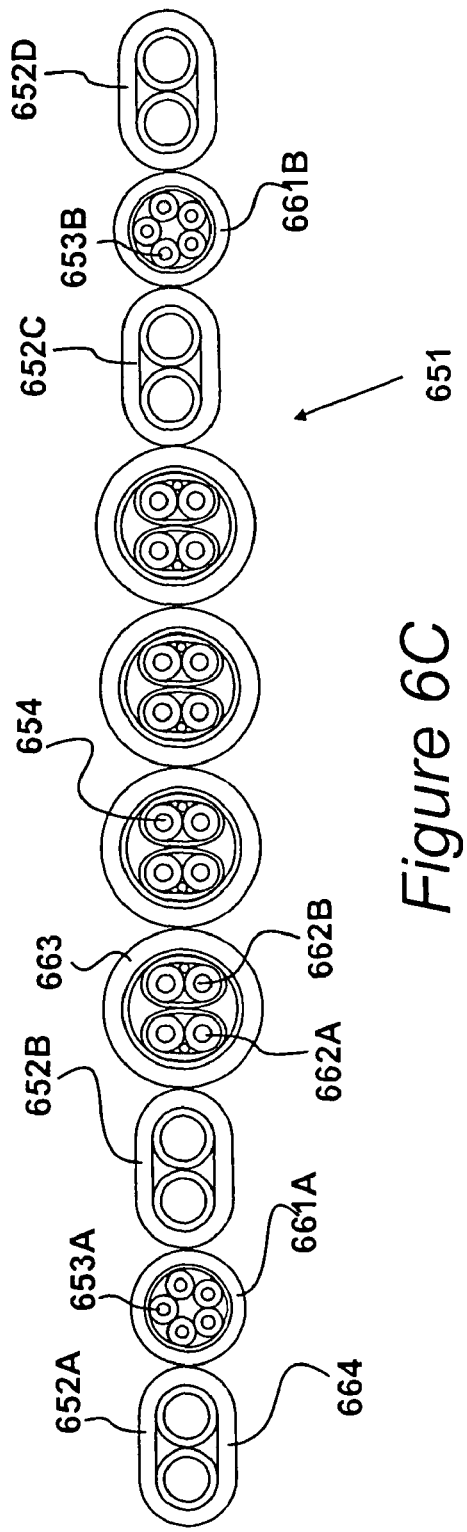
FIG. 6C shows a cross-section through an alternative electrical cable material 651.

A cross-sectional view of an alternative cable material 651 for use in the cable management units 310, 311, 312 is shown in FIG. 6C. Like the cable 607, cable material 651 has four pairs of power wires 652A, 652B, 653C and 653D. The first two pairs 652A and 652B of power wires are separated by a first set of five single wires 653A, and similarly the final two pairs 652C and 652D of power wires are separated by a second set of five single wires 653B. The cable material 651 is also similar to the cable material of cable 607 in that the inner two pairs 652B and 652C of power wires are separated by eight shielded parallel pairs of signal wires 654.

The construction of the cable material 651 differs from that of cable 607 in that the wires 653A and 653B are arranged in a substantially round form, and surrounded by a round polymer sheath 661A and 661B respectively. Each of the eight shielded parallel pairs of signal wires 654 are each grouped into pairs and surrounded by a polymer sheath. For example, a first shielded parallel pair 662A and a second shielded parallel pair 662B are located together within a polymer sheath 663. Each pair of power wires are also encased in a polymer sheath, such as sheath 664. The polymer sheaths, such as sheaths 661A, 661B, 663 and 664 are welded to an adjacent sheath, or sheaths, to form the cable material.

Thus, as shown in FIG. 6B, some parts of the cable material 651 are two or more wires thick. For example, the wires of the shielded parallel pairs, such as pair 662A, are arranged side by side across the thickness of the cable material. However, like cable 607, the cable material 651 has a width substantially larger than its thickness and therefore it is a ribbon cable in accordance with the definition given above.

In a further alternative cable, suitable for use in the present embodiment, a ribbon cable is formed of wires encapsulated within a silicone rubber extrusion.

FIG. 7

Figure 7:
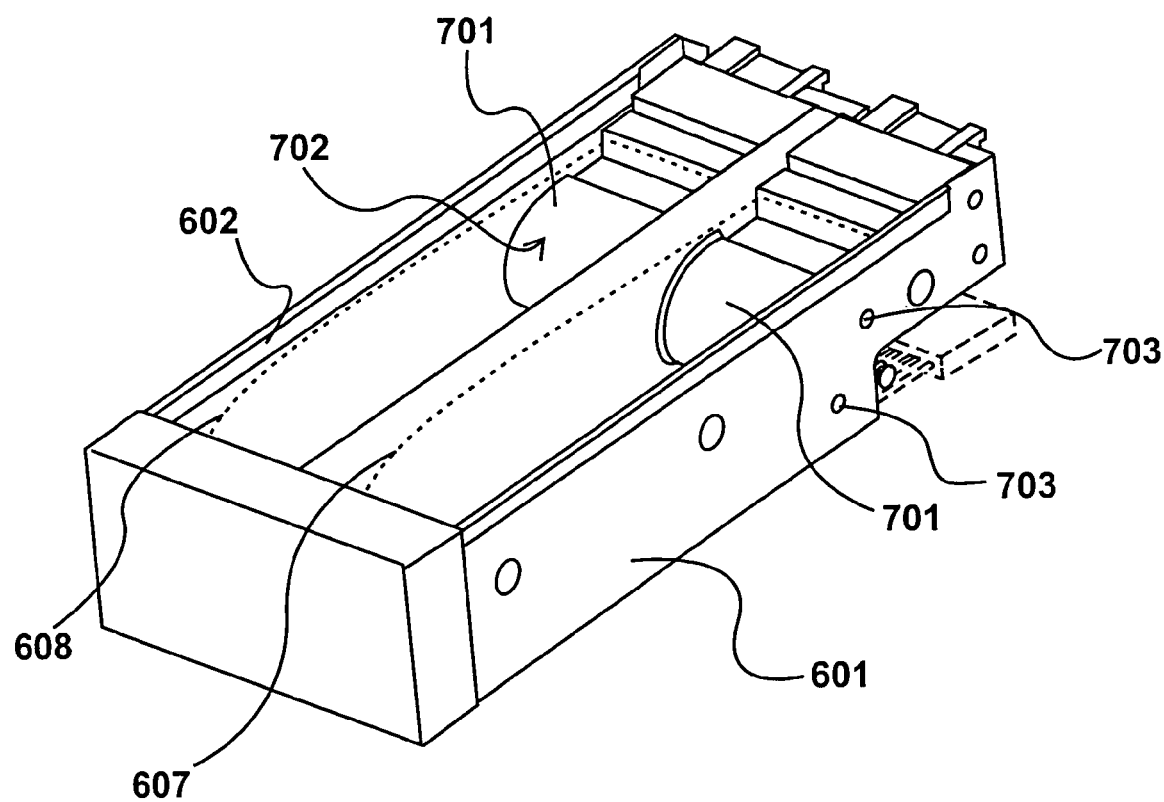
FIG. 7 shows the cable management unit 310 with the ribbon cables 607 and 608 in dotted outline only.

The cable management unit 310 is shown again in FIG. 7, but with the electrical cables 607 and 608 in dotted outline only. FIG. 7 also shows a rear view of a guide module 701 that is fixed within the cable management unit 310. The guide module 701 comprises a housing 702 formed of a solid plastics material. The housing 702 is held rigidly in place by screws 703, which extend through the side walls 601 and 602 of the cable management unit 310. The housing 702 supports inner components of the guide module 701, as will be described below, and also provides a barrier between the electrical cables 607 and 608 and these inner components.

FIGS. 8 & 9

Figure 8:
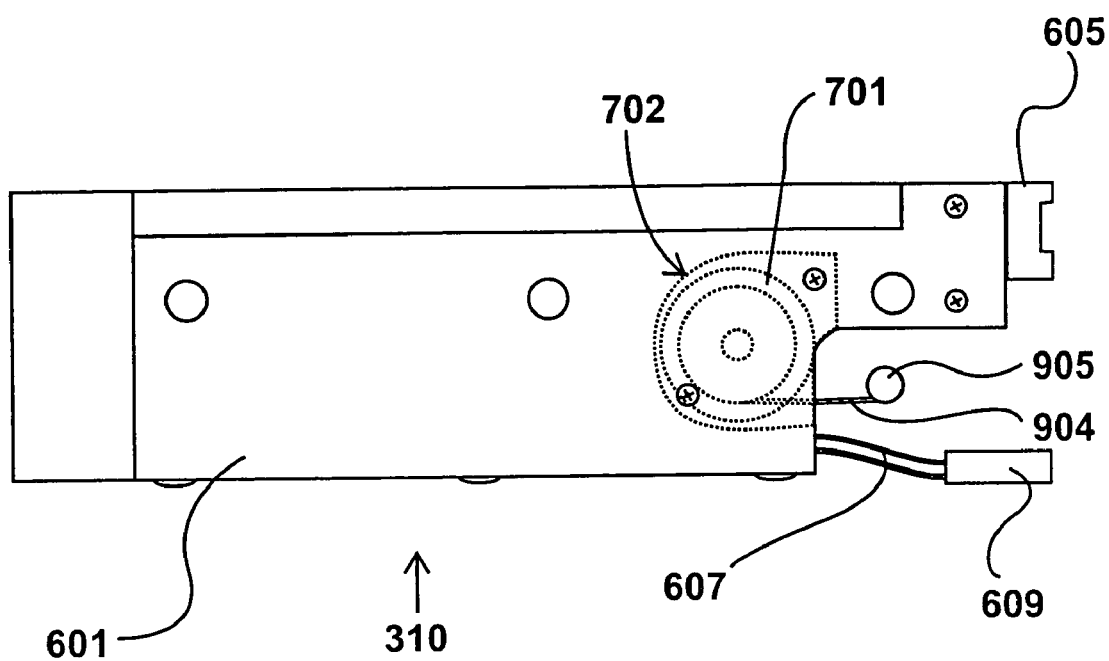
FIG. 8 shows a side view of the cable management unit 310.
Figure 9:
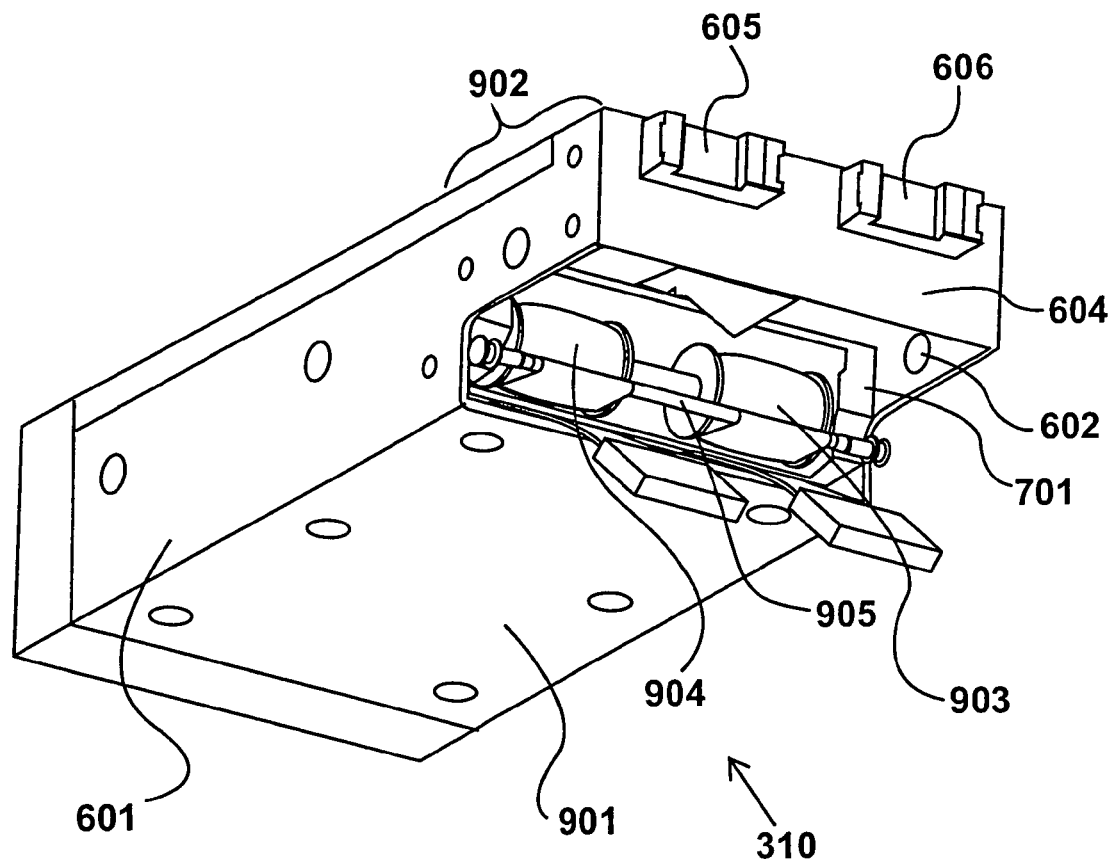
FIG. 9 shows another perspective view of the cable management unit 310.

The cable management unit 310 is shown again in the side view of FIG. 8 and the perspective view of FIG. 9. The perspective view of FIG. 9 shows the side wall 601 of cable management unit 310, the floor panel 901 and the front wall 604 which supports the electrical connectors 605 and 606.

As may be seen from FIGS. 8 and 9, the side walls 601 and 602 extend along the length of the floor panel 901 but have an upper portion 902 that extends substantially further forward than the floor panel 901. Thus, an aperture is defined between the side walls 601 and 602, the front wall 604 and the floor panel 901. The guide module 701 (shown in dotted outline in FIG. 8) is mounted within the cable management unit 310 adjacent to this aperture.

The guide module 701 comprises a pair of constant force springs 903 and 904 axially mounted and having a free end attached to a connecting rod 905. The constant force springs are shown in FIG. 9 in their stable, coiled up, configuration, having only a short substantially straight end portion connected to the connecting rod 905. However, it will be understood that by pulling on the connecting rod 905 it is possible to uncoil the constant force springs 903 and 904 such that they extend substantially linearly forward from the front of the cable management unit 310.

FIG. 10

Figure 10:
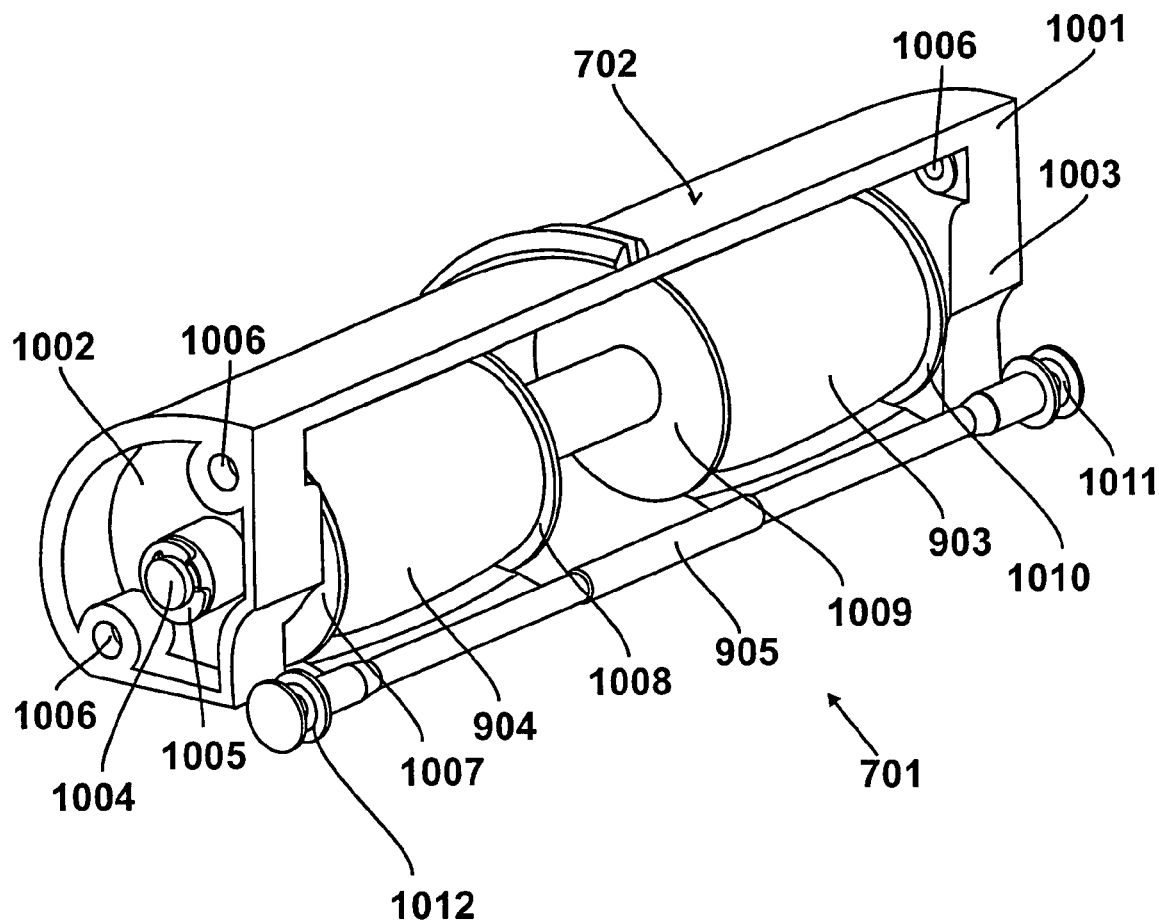
FIG. 10 shows the guide module 701 removed from the cable management unit.

The guide module 701 is shown removed from the cable management unit 310 in FIG. 10.

The guide module 701 comprises the housing 702, which defines a curved surface 1001 providing a barrier between the constant force springs 903 and 904 and the electrical cables during use. The housing 702 also defines end walls 1002 and 1003 which define coaxial apertures supporting a cylindrical axle 1004. As indicated in FIG. 10, the cylindrical axle 1004 is held in place by means of grooves formed adjacent to its ends and circlips 1005. The end walls 1002 and 1003 of the housing 702 also define apertures 1006 for receiving the screws 703 that hold the guide module 701 within the cable management unit 310.

The constant force springs 903 and 904 are mounted on bobbins 1007, 1008, 1009 and 1010, which are themselves mounted on the cylindrical axle 1004. The bobbins 1007, 1008, 1009, 1010 are free to rotate on the cylindrical axle 1004 and consequently the coiled portion of the constant force springs 903 and 904 are free to rotate around the cylindrical axle 1004.

The connecting rod 905 is provided with a relatively deep groove 1011 and 1012 adjacent to each of its two ends. The grooves 1011 and 1012 are sufficiently wide to receive a respective one of the two connecting arms 509 and 510 of the support unit 110. Furthermore, the spacing between the grooves 1011 and 1012 is arranged to be the same as the spacing between the connecting arms 508 and 509, such that in use the connecting arm 509 may be hooked around the connecting rod 905 within the groove 1012, while the connecting arm 508 may be hooked around the connecting rod 905 within the groove 1011.

FIG. 11

Figure 11:
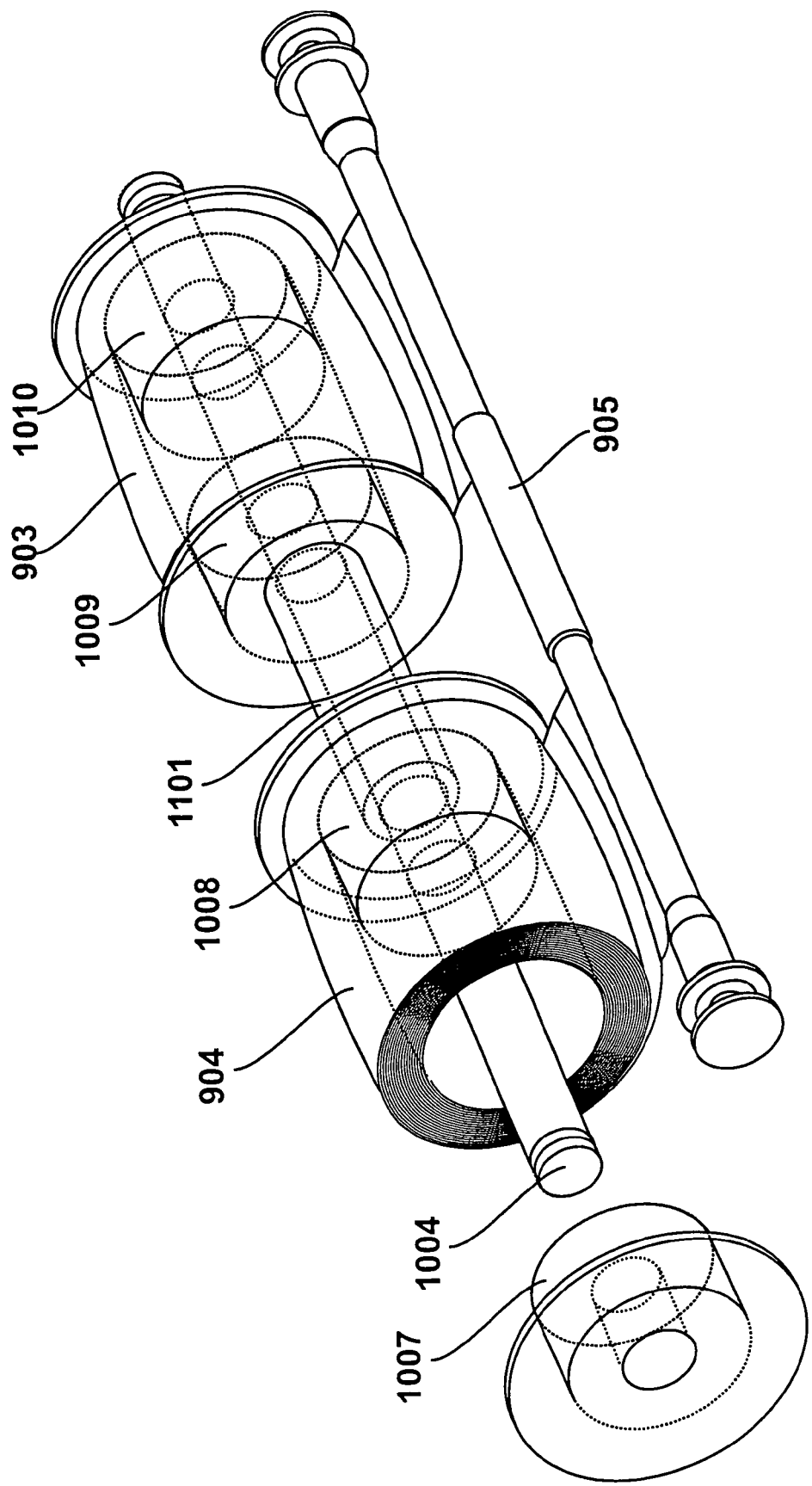
FIG. 11 shows partly disassembled internal components of the guide module.

Internal components of the guide module are shown in FIG. 11, partly disassembled. The constant force spring 903 is shown mounted on its bobbins 1009 and 1010, which are themselves mounted on the cylindrical axle 1004. The second constant force spring 904 is mounted on one of its bobbins 1008 which is itself mounted on the cylindrical axle 1004, but the fourth bobbin 1007 is removed from the cylindrical axle 1004. Thus, it is possible to see that the constant force spring 904 is formed of sheet material that is coiled up into a cylindrical shape. In the present embodiment, the constant force springs 903 and 904 are formed from a stainless steel strip having a thickness of 0.1 millimeters, and when they are coiled up, they have an outside diameter of approximately 25.4 millimeters and an internal diameter of approximately 22 millimeters.

The outer, free ends of the constant force springs are rigidly attached to the connecting rod 905, for example by welding.

As shown in FIG. 11, a short length of tubing 1101 is located on the cylindrical axle 1004 between bobbins 1008 and 1009 to maintain correct spacing between the constant force springs 903 and 904.

FIGS. 12 & 13

Figure 12:
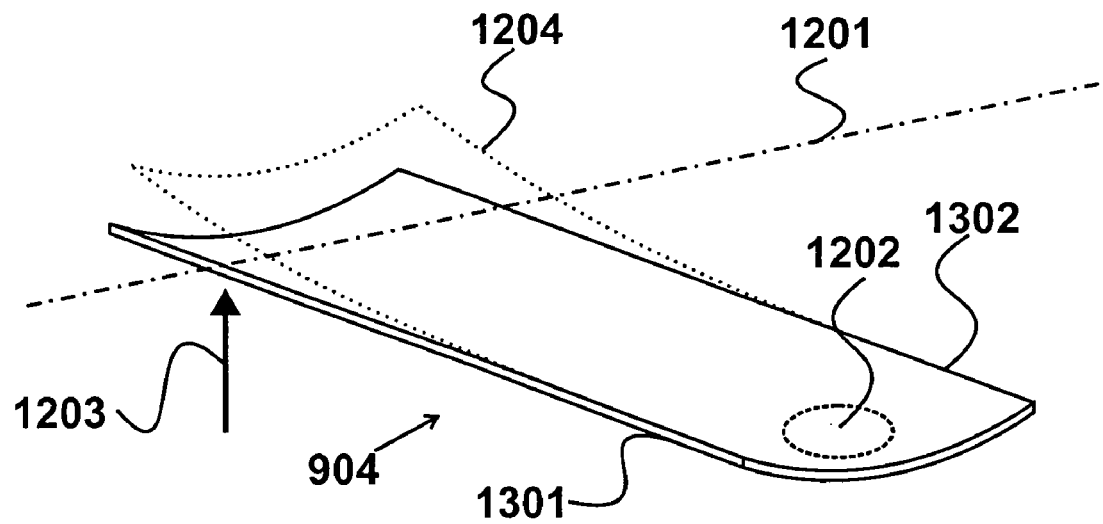
FIG. 12 shows a perspective view of a short length of the constant force spring 904.
Figure 13:
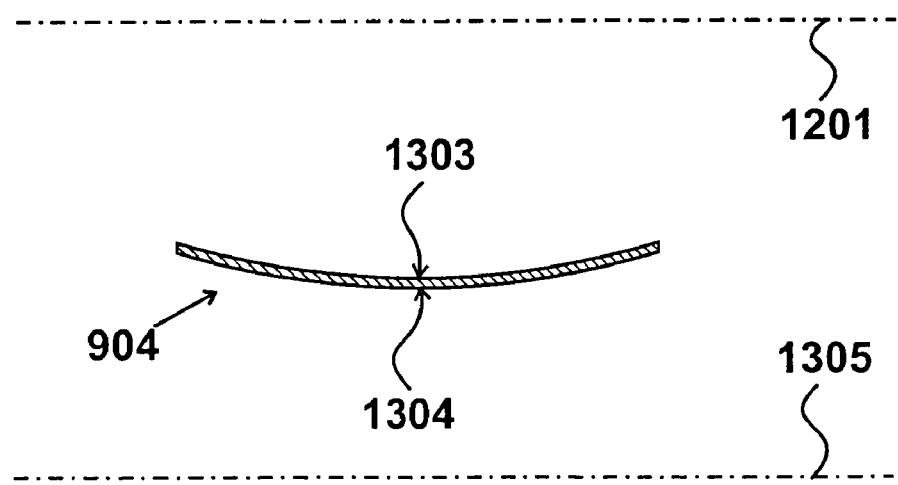
FIG. 13 shows a cross-sectional view of the constant force spring 904.

A short length of the constant force spring 904 is shown in the perspective view of FIG. 12, and a cross-sectional view of the constant force spring 904 is shown in FIG. 13. As shown best in FIG. 13, the constant force spring 904 has a preformed shape, such that from one of its edges 1301 the material of the constant force spring 904 forms a curve across its width to the opposite edge 1302. Therefore, one face 1303 of the constant force spring 904 has a concave shape, while the opposite face 1304 has a convex shape.

As a result of this shape of the constant force spring 904, it is possible to bend the constant force spring 904 about an axis, such as axis 1201, that is perpendicular to its length, and on the concave side of the constant force spring 904. For example, if the constant force spring 904 is held at a location 1202 and a force applied nearby (as indicated by arrow 1203) to the convex face of the constant force spring 904, the spring will bend up around the axis 1201 and take a new position as indicated by the dotted outline 1204. In contrast, if forces are applied to the constant force spring 904 in order to bend it in the opposite direction then this is resisted by the constant force spring 904 due to its curved form. For example, if a force opposite to that indicated by arrow 1203 is applied to the constant force spring 904 in an attempt to bend the spring around an axis 1305 on its convex side, then the spring resists bending. Consequently, it is possible for the spring to be rolled up as shown in FIG. 11 with the concave surface facing the inside of the coil, but, when the constant force spring 904 is uncoiled, it resists bending moments that attempt to bend the constant force spring 904 with its convex surface on the inside.

This feature of the constant force spring 904 is similar to that of a retractable steel tape measure which may be coiled up into a housing but when extended forms a substantially rigid straight length of material that resists bending. This feature of the constant force spring 904 is essential to its correct functioning in the present embodiment.

FIG. 14

Figure 14:
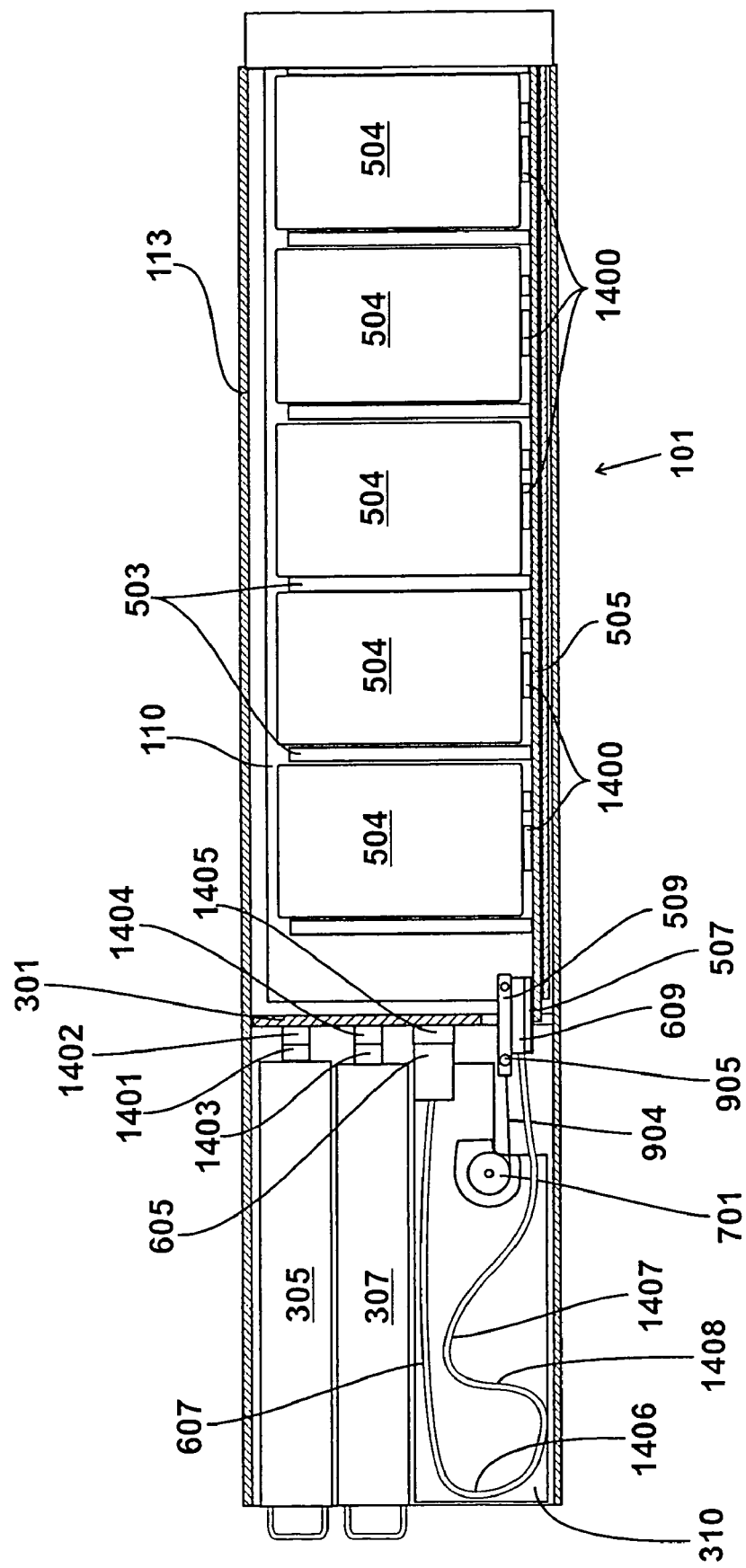
FIG. 14 shows a cross-sectional view of the data storage unit 101.

The data storage unit 101 is shown in a cross-sectional view in FIG. 14. As shown in FIG. 14, the printed circuit board 505 has an array of connectors 1400, each connector 1400 being configured to connect to a corresponding one of the data storage elements 504.

The control unit 305 is electrically connected to the mid-plane 301 by means of connectors 1401 and 1402 on the control unit 305 and mid-plane 301 respectively. Similarly, the power supply unit 307 is electrically connected to the mid-plane 301 by connectors 1403 and 1404. Similarly, the connectors 605 (and 606) of the cable management unit 310 are connected to corresponding connectors such as connector 1405 on the mid-plane 301. In this way, the three units 305, 307 and 310, (and also the other units 304, 306, 311 and 312 that are not shown in FIG. 14) are connected by suitable circuitry on the mid-plane 301.

The connector 609 of electrical cable 607 is connected to electrical connector 507 mounted on the printed circuit board 505 of the support unit 110. Though not shown in FIG. 14, the other electrical cable 608 is similarly connected to the connector 506 of the support unit 110. Consequently, the disk drives 504 of support unit 110 are connected via the printed circuit board 505, and its circuitry, through the two electrical cables 607 and 608 and the electrical connectors 605 and 606 to the mid plane 301. Thus, the control units 304 and 305 are able to provide access to the data stored on the disk drives 504 of support unit 110. (The disk drives of support units 111 and 112 are similarly connected via electrical cables of cable management units 311 and 312 to the mid plane 301, such that the control units 304 and 305 are able to provide access to data on these disk drives.)

As shown in FIG. 14, the connecting arm 509 of support unit 110 is hooked around the connecting rod 905 attached to the end of the constant force spring 904 of guide module 701. (Similarly the other connecting arm 508 is also hooked around the connecting rod 905.)

The support unit 110 is shown in its normal operating position in FIG. 14, that is the support unit is almost entirely enclosed within the outer enclosure 113 of the data storage unit 101. In this position, the cable 607 is almost entirely contained within a first space formed within the cable management unit 310, and the support unit 110 is contained within a second space in the outer enclosure. As illustrated in FIG. 14, the cable folds up into loops having relatively large radiuses of curvature. More specifically, the electrical cable forms a first loop defined by bend 1406 and a second separate loop defined by bend 1407 that is separated from bend 1406 by a point of inflection 1408.

It may be noted that for the purposes of this specification a loop is defined as a separately identifiable, continuous portion of cable containing a bend in which the cable turns through an angle of more than 90° and less than 360°.

It may also be noted that the loops are separate loops, and for the for the purposes of this specification, separate loops are defined as loops that are not formed around a shared spindle or former.

When the support unit 110 is withdrawn from the outer enclosure 113, the electrical cable 607 unfolds. In addition, under the forces applied by connecting arms 508 and 509 on the connecting rod 905, the constant force spring 904 uncoils.

FIG. 15

The support unit 110 is shown withdrawn from the outer enclosure 113 of data storage unit 101 in FIG. 15. As illustrated, the electrical cable 607 extends from its connector 609 back to the cable management unit 310 and around the guide module 701 to the connector 605. The constant force spring 904 has become uncoiled and a large portion of the constant force spring 904 extends between the connecting rod 905 and the guide module 701 directly above the electrical cable 607. Consequently, the electrical cable is sandwiched in between the floor 1501 of the outer enclosure 113 and the extended portion of the constant force spring 904.

As the support unit 110 is pushed back inside the outer enclosure 113 the natural stiffness of the electrical cable 607 causes the cable to be pushed back into the cable management unit 310. Meanwhile, the constant force spring 904, which has a tendency to coil up, coils itself up such that a length of the constant force spring 904 extending between the connecting rod 905 and the guide module 701 remains substantially straight.

FIG. 16

The data storage unit 101 is shown again in cross-section in FIG. 16, with the support unit 110 partially pushed back into the outer enclosure 113. Specifically, the support unit 110 has been pushed back such that it occupies approximately two thirds of the space provided for it within the outer enclosure 113, and the electrical cable 607 has been pushed into the cable management unit 310 sufficiently far such that it is pressing against the back wall of the cable management unit 310. At this point, the cable 607 is only formed into a single loop defined by the bend 1406 at the end of the cable management unit 310.

As the support unit 110 is pushed further back into the enclosure 113, the cable 607, being unable to move any further back due to the rear wall of cable management unit 310, begins to form a second loop.

FIG. 17

The data storage unit 101 is shown again in cross-section of FIG. 17 with the support unit 110 pushed further into the outer enclosure 113 when compared to FIG. 16. As shown in FIG. 17, as the cable 607 is not able to move back any further, it has started to form a second loop indicated by the bend 1701. Advantageously, the bend 1701 is within the cable management unit 310 between the back wall of the cable management unit 310 and the guide module 701.

It should be noted that, if a bend were to form between the support unit 110 and the mid-plane 301 this could cause the cable to snag on the mid-plane 301 such that the support unit 110 cannot be returned to its normal operating position (enclosed within the outer enclosure 113). However, if a bend should start to form in this portion of the electrical cable, it is prevented from developing due to the fact that the cable is enclosed from below by the floor 1501 of the outer enclosure 113 and above by the extended portion of the constant force spring 904. As discussed above with respect to FIGS. 12 and 13, the constant force spring 904 resists bending with its convex lower surface on the inside of the bend. Consequently, if the electrical cable 607 pushes up against the underside of the constant force spring 904, the spring 904 resists the force applied by the cable and prevents the cable forming a bend.

As the support unit 110 is pushed back further into the outer enclosure 113 from the position of FIG. 17 the new bend 1701 in the cable 607 increases to form a second loop as shown in FIG. 14.

It should be understood that the electrical cable 607 of the present embodiment is relatively stiff when compared to conventional ribbon cables used to make such high speed signal connections, due to the fact that the electrical cable 607 also contains the power wires providing power to the disk drives 504. The stiffness of the cable 607 results in it only folding into bends under relatively strong forces when compared to conventional ribbon cables. Consequently, it has been found that the electrical cable 607 in repeated movements of the support unit 110 always forms similar shaped loops 1406 and 1407 as shown in FIG. 14.

It will be understood that the guide module 701 provides a guide member (in the form of constant force spring 904) that is able to be stored in a relatively small volume in one configuration as shown in FIG. 14. The guide member is also able to extend to provide a relatively elongated member, sufficiently stiff to resist forces applied to it by the electrical cable 607, as illustrated in FIGS. 15, 16 and 17. In the present embodiment the constant force spring 904 provides such a guide member and also provides a means for retracting the guide member (into its coiled form). However, in an alternative embodiment the constant force spring 904 is replaced by a formed strip of steel having a similar curved shape to that of the constant force spring 904. A separate coiled spring is provided, attached to the guide member, for the purposes of retracting the guide member into its coiled form. Thus, in this alternative embodiment the guide member is extendible and retractable in a similar manner to an extendible steel tape measure.

It may be noted that in both the main embodiment and this alternative embodiment, the guide member retracts into a volume that is separate to the space occupied by the loops of folded electrical cable. Moreover, the mechanism by which the guide member retracts is substantially separate to the manner in which the electrical cable folds within the cable management unit 310. Thus, the cable is not required to coil up like the guide member, and the guide member is not required to fold in the manner of the cable.

In the above-described embodiment, the constant force spring 904 is connected to the support unit 110 by means of the connecting rod 905, at the end of the constant force spring, latching into the hooked ends of the connecting arms 508 and 509 of the support unit 110. In an alternative embodiment, the electrical connectors provided at the ends of the cables, such as electrical connectors 609, are mounted within a saddle element. The saddle element is provided with a pair of hook-shaped members configured to receive a connecting rod, such as the connecting rod 905. The saddle element is also provided with a spring-loaded screw configured to mate with a threaded hole provided on the printed circuit board 505, for securely attaching the electrical connectors 609 to the printed circuit board. In this embodiment, the connecting rod 905 is latched onto the hook-shaped members of the saddle element before the electrical connectors 609 are connected to the electrical connectors 506 and 507 on the printed circuit board 505 and secured in place by the spring-loaded screw. Thus, the connecting rod 905 is secured to the support unit 110 in the same process as securing the electrical connectors 609 to the printed circuit board 505.

Figure 18A:
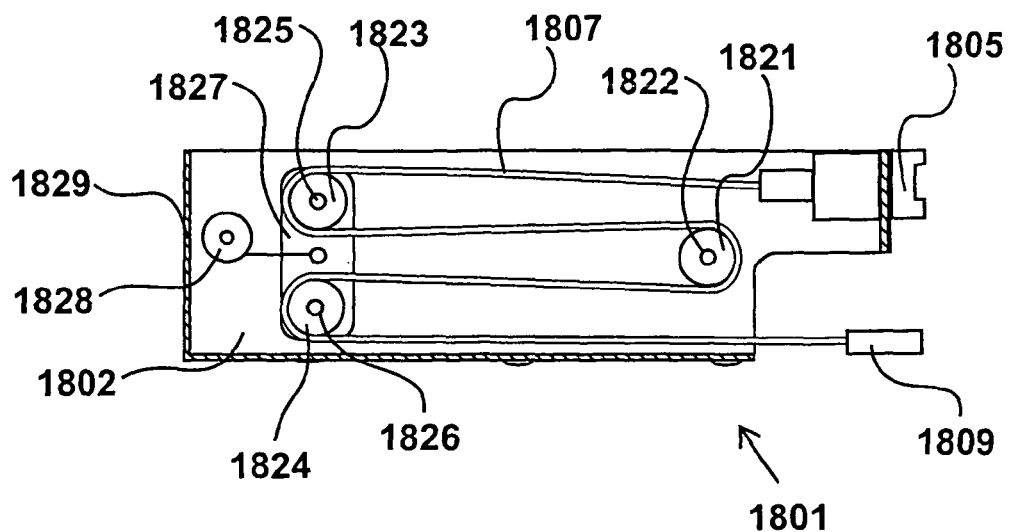
FIGS. 18A and 18B show an alternative cable management unit 1801 of an alternative embodiment of the data storage unit.
Figure 18B:
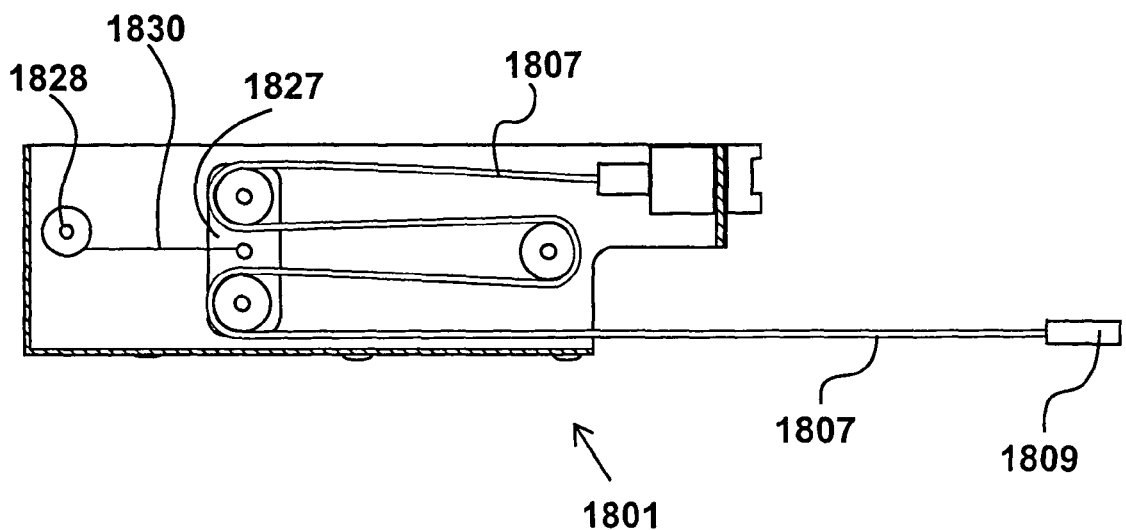

FIGS. 18A and 18B

In an alternative embodiment of the data storage unit 101, the cable management units 310, 311 and 312 are each replaced by an alternative cable management unit 1801 as shown in the cross-sectional side view of FIG. 18A. The cable management unit 1801 has an outer box-like housing 1802 of the same type as that of cable management unit 310, and also has a pair of connectors 1805, for connecting to the mid-plane 301, of similar type to connectors 605, 606. The connectors 1805 are each connected to a respective electrical cable 1807 that is terminated by a connector 1809. The connectors 1809 are connected to the electrical connectors 506 and 507 on the respective support unit 110, 111 or 112 (not shown in FIG. 18A).

The electrical cables 1807 are ribbon cables as herein defined above, and in the present embodiment, they have the same structure as cable 607.

The cable management unit 1801 differs from cable management unit 310 in the manner in which it guides the cable into its withdrawn configuration, as shown in FIG. 18A. The cable management unit 1801, includes a first pulley 1821 mounted on a fixed cylindrical axle 1822 that is rigidly mounted between the side walls of the box-like housing 1802, towards the front end of the cable management unit 1801. A second pulley 1823 and third pulley 1824 are each mounted on a respective cylindrical axle 1825 and 1826, these cylindrical axles being rigidly mounted on a slidable carriage 1827. The slidable carriage 1827 is mounted within the housing 1802, to the rear of the first pulley 1821, such that the slidable carriage is able to slide along the length of the cable management unit 1801. The slidable carriage 1827 is also connected to one end of a constant force spring 1828, the coiled end of which is mounted adjacent to the rear wall 1829 of the housing 1802. The constant force spring 1828 applies a substantially constant force to the slidable carriage 1827 urging it back towards the rear wall 1829.

The cables 1807 extend back from the electrical connectors 1805 and around the second pulley 1823, then extend forward and around the first pulley 1821, back and around the third pulley 1824 and then forward through the aperture at the front of the cable management unit 1801. Thus, the cables 1807 form a loop around each of the three pulleys 1823, 1821 and 1824.

By this method of mounting the cables 1807, the length of cable extending from the front of the cable management unit 1801 is extendible by pulling on the connector 1809. In addition, when the pulling force applied to the connector 1809 is reduced the force of the constant force spring 1828 pulls the slidable carriage 1827 backwards causing the cable 1807 to retract into the cable management unit 1801. Consequently, the constant force spring 1828 keeps the cable 1807 in tension.

Thus, when the respective support unit (110, 111, 112) is pulled forward from the outer enclosure 113 of the data storage unit 101 (as illustrated in FIG. 2), the cable 1807 extends forward from cable management unit 1801, and the slidable carriage 1827 slides forward against the force of the constant force spring 1828.

The cable management unit 1801 is shown in FIG. 18B after the cables 1807 have been partly pulled from the cable management unit 1801. Consequently, the slidable carriage 1827 has been pulled forward under the forces from the cables 1807 and a portion 1830 of the constant force spring 1828 has been unwound from its coiled configuration.

When the support unit 110 is pushed back into the main part 114 of the data storage unit 101, the force on the connector 1809 is reduced. As a result, the constant force spring 1828 pulls the slidable carriage 1827 backwards causing the loops of the cables 1807 within the cable management unit 1801 to be increased in length and the portions of cables 1807 extending from the cable management unit 1801 to be withdrawn back into the unit 1801. However, because the constant force spring 1828 ensures that the cables 1807 are kept in tension, the portions of cable extending from the front of the cable management unit 1801 are kept substantially straight and flat, and snagging of the cables is avoided.

Thus, the pulley system comprising the fixed pulley 1821 and the carriage mounted pulleys 1823 and 1824 provide an alternative guide means for casing the cable 1807 to develop loops within the second space, formed within the cable management unit 1801. However, in this embodiment, the loops are permanently formed and only reduce, and increase, in size as the support unit is respectively pulled out from, and pushed into, the outer enclosure 113 of the main part 114.

Figure 19A:
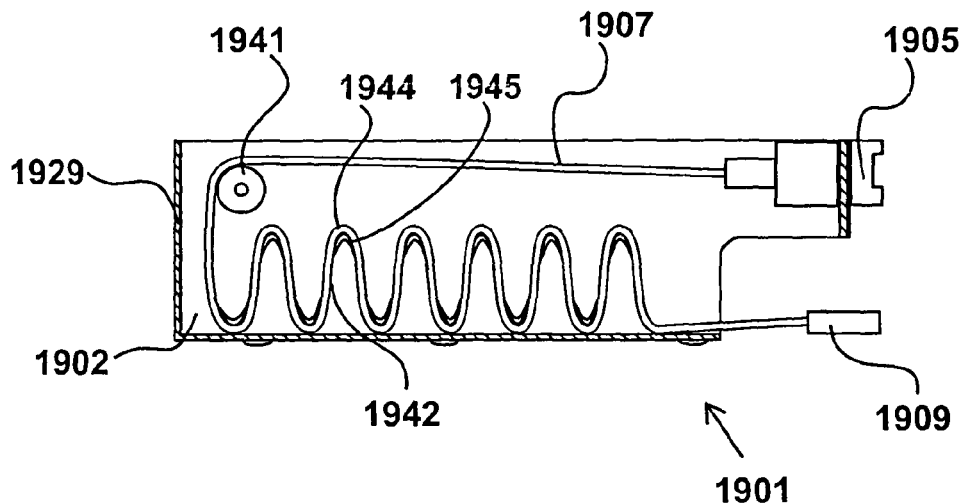
FIGS. 19A and 19B show a further alternative cable management unit 1901 of an alternative embodiment of the data storage unit.
Figure 19B:
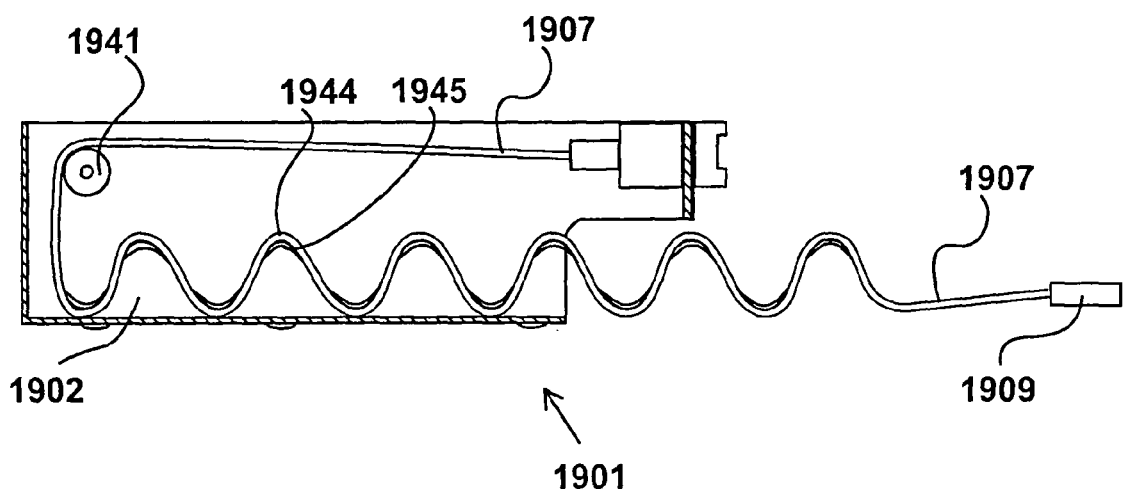

FIGS. 19A and 19B

In a further alternative embodiment of the data storage unit 101, the cable management units 310, 311 and 312 are each replaced by an alternative cable management unit 1901 as shown in the cross-sectional side view of FIG. 19A. The cable management unit 1901 has an outer box-like housing 1902 of the same type as that of cable management unit 310, and also has a pair of connectors 1905, for connecting to the mid-plane 301, of similar type to connectors 605, 606. The connectors 1905 are each connected to a respective electrical cable 1907 that is terminated by a connector 1909. The connectors 1909 are connected to the electrical connectors 506 and 507 on the respective support unit 110, 111 or 112 (not shown in FIG. 19A).

The electrical cables 1907 of the present embodiment have a structure like that of cable 607, and therefore the electrical cables 1907 are ribbon cables as defined herein.

The ribbon cables 1907 each have a substantially straight portion extending backwards from the connectors 1905 to a post 1941 rigidly mounted between the side walls of the housing 1902 near to its back wall 1929. Each of the cables 1907 bend around the post 1941 and extend downwards to a portion 1942 of the cable that is formed into a plurality of loops (in this example 12 loops). A substantially straight portion 1943 of the cables 1907 extends from the looped portions 1942 to the respective connector 1909.

Each of the loops in the cable 1907 is defined by a bend of approximately 180°, such as bend 1944. Each bend has an associated shaped resilient element rigidly attached to the cable on the inside of the bend. Thus, for example, bend 1944 has a resilient element 1945 attached to the cable 1907 on the inside of the bend. The resilient elements are moulded in a plastics material and attached to the cable by adhesive.

The resilient elements are shown in FIG. 19A in their relaxed shape, that is they are not being mechanically stressed. However, when the support unit (110, 111 or 112) attached to the connectors 1909 is pulled out from the outer enclosure 113 of the data storage unit 101 a force is applied to the connectors 1909 pulling them away from the housing 1902. The force causes the loops in the cables to be opened up and reduced in height, and several of the loops to pass from the housing to the front of the cable management unit 1901. The resilient elements are consequently distorted from their relaxed shape.

The cable management unit 1901 is shown again in FIG. 19B with an extended portion of the cables 1907 extending from the front of the cable management unit 1901. Thus, in this configuration the resilient elements, such as element 1945, are elastically deformed. When the relevant support unit (110, 111 or 112) is pushed back into the main part of the data storage unit 101, the forces applied to the connectors are reduced. Consequently, the forces applied to the cables 1907 by the elastically deformed resilient elements cause the cables to return to their original shape (shown in FIG. 19A) with enlarged loops and tighter bends, and all of the loops within the housing 1902.

Figure 20A:
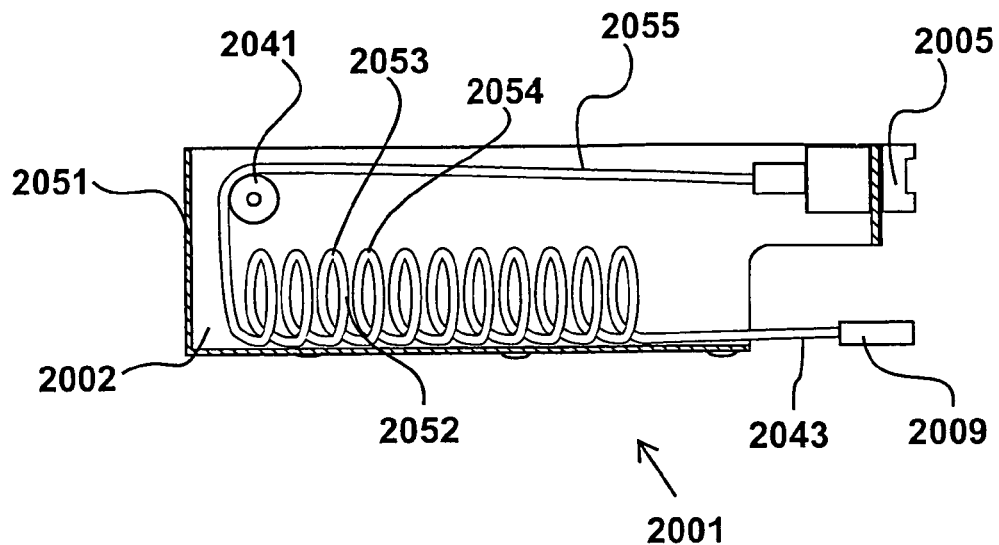
FIGS. 20A and 20B show a further alternative cable management unit 2001 of an alternative embodiment of the data storage unit.
Figure 20B:
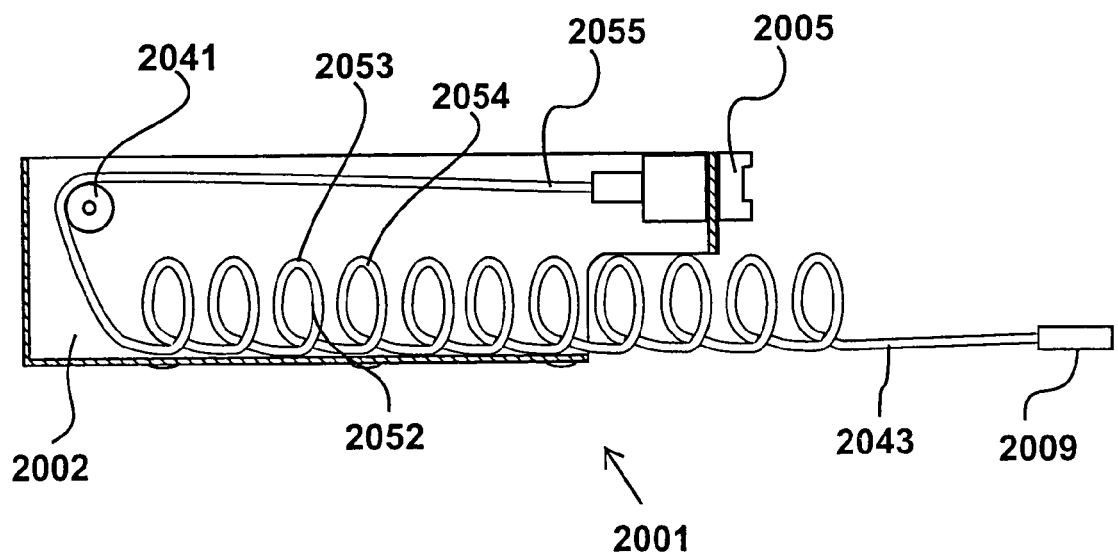

FIGS. 20A and 20B

In a further alternative embodiment of the data storage unit 101, the cable management units 310, 311 and 312 are each replaced by an alternative cable management unit 2001 as shown in the cross-sectional side view of FIG. 20A. The cable management unit 2001 has an outer box-like housing 2002 of the same type as that of cable management unit 310, and also has a pair of connectors 2005, for connecting to the mid-plane 301, of similar type to connectors 605, 606. The connectors 2005 are each connected to a respective cable 2051 that is terminated by a connector 2009. The connectors 2009 are connected to the electrical connectors 506 and 507 on the respective support unit 110, 111 or 112 (not shown in FIG. 20A).

The cables 2051 differ from the cables of the previously described embodiments in that they are not ribbon cables, as herein defined. The cables 2051 have a substantially round cross-section and an outer casing formed of a plastics material. A middle portion 2052 of each cable 2051 is formed into a helical shape. The outer casing of the cable is resilient and is formed such that it is in its relaxed state when formed into such a helix. Similar such cables are well known for connecting handsets of telephones to their bases, but the cable 2051 has fewer and larger diameter loops, than the loops found in a common telephone cable. In the present example, the cable 2051 has eleven approximately circular loops, such as loops 2053 and 2054.

It should be noted that each of the loops of the cables 2051 are separately formed and they are all have substantially the same radius of curvature.

The cable management unit 2001 has a post 2041 fixed between the side walls of the housing 2002. The cables 2051 each have a substantially straight portion 2055 that extends from the electrical connectors 2005 around the post 2041 to the helical shaped middle portion 2052. A second substantially straight portion 2043 of each cable 2051 extends between the middle portion 2052 and one of the connectors 2009.

When the support unit (110, 111 or 112) is pulled forward, the force applied to the electrical connector 2009 causes the loops of the cable 2051 to become more separate from each other and so the cable is able to extend in a similar manner to a telephone cable.

The cable management unit 2001 is shown again in FIG. 20B with the connector 2009 pulled forward from the housing 2002. As shown the loops, such as loops 2053 and 2054 have become more separated, and several (in this example four) of the loops have passed out from the space within the unit 2001 to the front of the unit. In this configuration, the casing of the cable 2051 is in an elastically deformed state, and consequently the middle portion 2052 acts like a spring placing the straight portion 2043 in tension.

When the support unit (110, 111 or 112) is pushed back into the main part of the data storage unit 101, the stretched middle portion 2052 tends to pull the end portion 2043 of the cable back into the housing 2009, as the middle portion returns to its relaxed, undistorted shape.

Thus, in the present embodiment, the resilient outer casing of the cable 2051, which has a relaxed state in which a portion of the cable is coiled into a helical shape, provides a guide means for the cable.

The invention claimed is:

1. Apparatus for supporting data storage elements and supplying stored data, said apparatus comprising:
   a support unit having a plurality of connectors for connecting to a plurality of data storage elements;
   a ribbon cable having a first end connected to said support unit and a second end connected to a main part of the apparatus;
   the main part defining a first space containing a portion of said ribbon cable, and a second space for containing said support unit, such that said support unit is movable between (I) a first position providing access to said data storage elements and (ii) a second position in which said data storage elements are located within said second space; and
   guide means located and configured for juxtaposition with the ribbon cable during movement of the support unit between the first position and the second position, and to enable said ribbon cable to depart from juxtaposition with the guide means and be folded into at least two separate loops occupying a space within said first space as said support unit is moved to said second position, said guide means comprising a retractable guide member separate from the ribbon cable and located and configured to extend in juxtaposition with the ribbon cable as said support unit is moved between said second position and said first position, and to retract from juxtaposition with the ribbon cable when said support unit is in said second position, and wherein, upon retraction, the guide member is retracted into a volume separate from the space occupied by the at least two separate loops of folded ribbon cable.

2. Apparatus according to claim 1, wherein said apparatus further comprises a plurality of data storage elements, each said data storage element being connected to one of said connectors.

3. Apparatus according to claim 1, wherein said first space is defined by a box having a floor, and said ribbon cable is arranged to extend between said floor and said guide means.

4. Apparatus according to claim 1, wherein said guide member is movable between a first configuration in which a portion of said guide member extends through said second space to a second configuration in which at least a part of said portion is retracted into said first space.

5. Apparatus according to claim 1, wherein said second space is defined by a box having a second floor, and said cable is arranged to extend between said second floor and a portion of said guide member when said guide member extends through said second space.

6. Apparatus according to claim 1, wherein one end of said guide member is retained within said second space.

7. Apparatus according to claim 1, wherein said guide member is configured to roll up while said support unit is moved between said first position and said second position.

8. Apparatus according to claim 1, wherein said guide member is an elongate shape configured to bend easily in a first direction and less easily in a second direction opposite to said first direction, so that said guide member bends in said first direction to roll up during retraction, and resists bending in the opposite second direction when guiding said ribbon cable.

9. Apparatus according to claim 1, wherein said guide means comprises a spring, such that force generated by the spring urges said guide member to a retracted configuration.

10. Apparatus according to claim 1, wherein said guide member comprises a constant force spring, such that force generated by the constant force spring urges said guide member into a retracted configuration.

11. Apparatus according to claim 1, wherein said apparatus comprises a housing partially surrounding a retracted portion of said guide means to prevent said ribbon cable from contacting said retracted portion of said guide means.

12. Apparatus according to claim 1, wherein said ribbon cable comprises a plurality of signal wires and a plurality of power wires.

13. Apparatus according to claim 1, wherein said ribbon cable is a ribbon cable as defined herein and said cable has a plurality of signal wires arranged between a first power wire and a second power wire.

14. Apparatus according to claim 1, further comprising a second support unit having a plurality of connectors for connecting to a second group of data storage elements, wherein said second support unit is movable, independently from said first support unit, between (I) a first position providing access to said second group of data storage elements and (ii) a second position in which said second group of data storage elements are located within said second space of said main part.

15. Apparatus according to claim 1, wherein said guide means is configured to prevent the development of loops within a portion of said ribbon cable that is within said second space.

16. Apparatus according to claim 1, wherein said main part comprises an outer enclosure and a control unit located within said outer enclosure for controlling the flow of data output from said data storage elements.

17. Apparatus according to claim 1, wherein said main part has a mounting plate provided with apertures to allow the data storage unit to be attached to rails of a rack unit.

18. A method of manufacturing apparatus for storing data and supplying stored data, said method comprising:
- producing a support unit having a plurality of connectors for connecting to a plurality of data storage elements;
- connecting a plurality of data storage elements, to said connectors of said support unit;
- producing a main part by locating a control unit within an outer enclosure, said main part defining a first space and a second space;
- connecting a ribbon cable between said support unit and said main part;
- extending a guide member such that said guide member extends from said support unit through said second space in juxtaposition with said cable; and
- sliding said support unit from a first position in which access is provided to said data storage elements to a second position in which said data storage elements are located within said second space, said ribbon cable is folded into at least two loops within said first space and said guide member is retracted into a volume separate from the space occupied by the at least two loops of folded ribbon cable.

19. A method of manufacturing apparatus in accordance with claim 18, wherein said method comprises: locating said guide member in a retracted configuration within said main part; extending said guide member such that it extends through said second space; and connecting said guide member to said support unit.

* * * * *